US012572729B2

(12) United States Patent
Kahng et al.

(10) Patent No.: US 12,572,729 B2
(45) Date of Patent: Mar. 10, 2026

(54) INTEGRATED-CIRCUIT GLOBAL ROUTING METHOD

(71) Applicant: The Regents of the University of California, Oakland, CA (US)

(72) Inventors: Andrew Kahng, Del Mar, CA (US); Bangqi Xu, San Diego, CA (US); Seungwon Kim, San Diego, CA (US)

(73) Assignee: The Regents of the Univeristy of California, Oakland, CA (US)

( * ) Notice: Subject to any disclaimer, the term of this patent is extended or adjusted under 35 U.S.C. 154(b) by 696 days.

(21) Appl. No.: 17/927,169

(22) PCT Filed: Jun. 2, 2021

(86) PCT No.: PCT/US2021/035411
§ 371 (c)(1),
(2) Date: Nov. 22, 2022

(87) PCT Pub. No.: WO2021/252239
PCT Pub. Date: Dec. 16, 2021

(65) Prior Publication Data
US 2023/0205968 A1    Jun. 29, 2023

Related U.S. Application Data

(60) Provisional application No. 63/036,031, filed on Jun. 8, 2020.

(51) Int. Cl.
G06F 30/3947 (2020.01)
G06F 30/3953 (2020.01)
(Continued)

(52) U.S. Cl.
CPC ...... G06F 30/3947 (2020.01); G06F 30/3953 (2020.01); *G06F 2119/06* (2020.01); *G06F 2119/12* (2020.01)

(58) Field of Classification Search
USPC ......................................................... 716/129
See application file for complete search history.

(56) References Cited

U.S. PATENT DOCUMENTS

| 7,506,289 | B1 | 3/2009 | Chapman | |
| 2009/0319977 | A1* | 12/2009 | Saxena | ............... G06F 30/394 |
| | | | | 716/129 |
| 2015/0220674 | A1 | 8/2015 | Mihal et al. | |

FOREIGN PATENT DOCUMENTS

WO        2014195806 A2    12/2014

OTHER PUBLICATIONS

Ajayi, T., et al., "OpenROAD: Toward a Self-Driving, Open-Source Digital Layout Implementation Tool Chain", Proceedings of Government Microcircuit Applications and Critical Technology Conference, 2019, pp. 1105-1110.

(Continued)

*Primary Examiner* — Bryce M Aisaka
(74) *Attorney, Agent, or Firm* — Greer, Burns & Crain, Ltd.; Steven P. Fallon

(57) ABSTRACT

A method for automatically creating a global routing solution for an integrated circuit. The method includes generating n original population of GR solutions. In one or more subsequent phases the method generates succeeding populations of GR solutions. The generation of each succeeding population includes determining a plurality of base GR solutions from the current population of GR solutions, determining a plurality of DRC hotspot areas within the plurality of base GR solutions, determining a plurality of patching GR solutions from which patches may be extracted, and hybridizing patching of GR solutions into base GR solutions.

20 Claims, 24 Drawing Sheets

(51) Int. Cl.
   *G06F 119/06* (2020.01)
   *G06F 119/12* (2020.01)

(56) References Cited

OTHER PUBLICATIONS

Alpert, C., et al., "The Importance of Routing Congestion Analysis", DAC47, 2010, pp. 1-14.

Boese, K., et al., "A new adaptive multi-start technique for combinatorial global optimizations", Operations Research Letters 16, 1994, pp. 101-113.

Chen, H., et al., "Global and detailed routing", Chapter 12 in L.-T. Wang, Y.-W. Chang and K.-T. Cheng (Eds.), Electronic Design Automation: Synthesis, Verification, and Test, Morgan Kaufmann, 2009, pp. 687-749.

Cohoon, J., et al., "Evolutionary Algorithms for the Physical Design of VLSI Circuits", Advances in Evolutionary Computing, Natural Computing Series, 2003, pp. 683-711.

Dolgov, S., et al., "ICCAD 2019 LEF/DEF Based Global Routing Contest", Proc. ICCAD, 2019.

Esbensen, Henrik, "A Macro-Cell Global Router Based on Two Genetic Algorithms", ACM, 1994, pp. 428-433.

Hagen, L., et al, "Combining Problem Reduction and Adaptive Multistart: A New Technique for Superior Iterative Partitioning", IEEE Transactions on Computer-Aided Design of Integrated Circuits and Systems, 1997, vol. 16, No. 7, pp. 709-717.

Kahng, Andrew B., "INVITED: Reducing Time and Effort in IC Implementation: A Roadmap of Challenges and Solutions", DAC '18: The 55th Annual Design Automation Conference 2018.

Kahng, A., et al., "TritonRoute: The Open Source Detailed Router", IEEE Transactions on Computer-Aided Design of Integrated Circuits and Systems, 2021, vol. 40, Issue: 3, pp. 1-12.

Li, H., et al., "Dr. CU 2.0: A Scalable Detailed Routing Framework with Correct-by-Construction Design Rule Satisfaction", IEEE, 2019, pp. 1-7.

Lienig, J., et al., "A Genetic Algorithm for Channel Routing in VLSI Circuits", Evolutionary Computation, 1994, pp. 1-12.

Liu, W., et al., "ISPD 2019 Initial Detailed Routing Contest and Benchmark with Advanced Routing Rules" Session: Detailed Routing Contest Results, ISPD, 2019, pp. 147-151.

Mantik, S., et al., "ISPD 2018 Initial Detailed Routing Contest and Benchmarks", Interconnect Optimization and Detailed Routing Contest Results, ISPD, 2018, pp. 140-143.

Nam, G., et al., "Invited Talk ISPD Placement Contest Updates and ISPD 2007 Global Routing Contest", Proc. SPD, 2007, pp. 167-167.

Nam, G., et al., "The ISPD Global Routing Benchmark Suite", Proc. ISPD, 2008, pp. 156-159.

Ravikumar, D., et al., "A genetic algorithm approach for global routing of VLSI circuits", International Journal of Engineering & Technology, 2018, vol. 7, pp. 394-397.

Schnecke, V., et al., "An Adaptive Parallel Genetic Algorithm for VLSI-Layout Optimization", 4th Int. Conf. on Parallel Problem Solving from Nature (PPSN IV), 1996, pp. 1-10.

Seo, J., et al., "Pin Accessibility-Driven Cell Layout Redesign and Placement Optimization", DAC, 2017, pp. 54:1-54:6.

Shojaei, H., et al., "Collaborative Multi-Objective Global Routing", IEEE Transactions on VLSI Systems, 2013, vol. 21, Issue: 7, pp. 1-14.

Taghavi, T., et al., "New Placement Prediction and Mitigation Techniques for Local Routing Congestion", IEEE, Proc. ICCAD, 2010, pp. 621-624.

Viswanathan, N., et al., "The DAC 2012 Routability-Driven Placement Contest and Benchmark Suite", DAC, 2012, pp. 774-782.

Xu, Y., et al., "FastRoute 4.0: Global Router with Efficient Via Minimization", IEEE, Proc. ASPDAC, 2009, pp. 576-581.

International Search Report from the corresponding International Patent Application No. PCT/US21/35411, dated Aug. 4, 2021.

* cited by examiner

805

809

INTEGRATED-CIRCUIT GLOBAL ROUTING METHOD

PRIORITY CLAIM AND REFERENCE TO RELATED APPLICATION

The application claims priority under 35 U.S.C. § 119 and all applicable statutes and treaties from prior U.S. provisional application Ser. No. 63/036,031 which was filed Jun. 8, 2020.

STATEMENT OF GOVERNMENT INTEREST

This invention was made with government support under HR0022-18-2-0032 awarded by the Defense Advanced Research Projects Agency. The government has certain rights in the invention.

FIELD

A field of the invention is integrated circuit fabrication and other fields include IC layout design and implementation of the layout with optical lithography and patterned deposition to accomplish IC fabrication. Example applications of the invention include synthesis, floor planning, placement and routing of two-dimensional and three-dimensional VLSI circuits. Another example application of the invention is circuit design optimizers. This invention particularly concerns integrated-circuit (IC) layout design and optimization, particularly to the global routing step within the "place-and-route" stage of IC physical design. A particular application is to 2D IC design and to FPGA (field-programmable gate array) place-and-route, which includes a very challenging global+detailed routing phase of the design implementation.

TABLE OF ACRONYMS
The following table defines acronyms/abbreviations used throughout the following description:

| | |
|---|---|
| API | Application Programming Interface |
| CAD | Computer Aided Design |
| DR | Detailed Routing |
| DRC | Design Rule Check Violation |
| EDA | Design Automation Tool |
| FPGA | Field-Programmable Gate Array |
| GA | Genetic Algorithm |
| GR | Global Routing |
| IC | Integrated Circuit |
| M1 | Metal-1 |
| Mx | Metal-x |
| VLSI | Very Large Scale Integrated |

BACKGROUND

The role of global routing, relative to detailed routing, within the modern place-and-route flow has substantially converged over the past decades. As has been well-described in publications such as (1) C. J. Alpert and G. E. Tellez, "The Importance of Routing Congestion Analysis", *DAC Knowledge Center Online Article* (2010); (2) H.-Y. Chen and Y.-W. Chang, "Global and Detailed Routing", (3) Chapter 12 in L.-T. Wang, Y.-W. Chang and K.-T. Cheng (Eds.), *Electronic Design Automation: Synthesis*, Verification, and Test, Morgan Kaufmann, 2009; (4) S. Dolgov, A. Volkov, L. Wang and B. Xu, "2019 CAD Contest: LEF/DEF Based Global Routing", *Proc. ICCAD*, 2019, DOI: 10.1109/IC-CAD45719.2019.8942107; and (5) S. Mantik, G. Posser, W.

Chow, Y. Ding and W.-H. Liu, "ISPD 2018 Initial Detailed Routing Contest and Benchmarks", *Proc. ISPD*, 2018, pp. 140-143; the global router determines a 3-dimensional coarse routing of nets within a ggrid representation of the routing resource available on the IC's metal layers. The global routing is an essential step of IC physical design after the placement step has been performed: without global routing, the routing problem is far too complex for the detailed router. The global router plays the important role of reducing the complexity of the detailed routing, by providing coarse or rough guides that the detailed router can follow. The global routing solution should be carefully optimized to comprehend timing and power considerations, and, most importantly the management of congestion that can potentially cause "hotspots" and failure of the much more time-consuming detailed routing step that ensues. Based on the global routing solution, the detailed router will typically perform initial track assignment and a series of iterations to reach a final solution that has an acceptable number of design-rule check violations (DRCs). Typically, the detailed router will report the number of routing violations in its solution at the end of each iteration, which can enable prediction of final detailed routing outcomes (Section 3.3 of INVITED: Reducing Time and Effort in IC Implementation: A Roadmap of Challenges and Solutions, DAC-2018).

In an exemplary context of semi-custom, standard-cell based IC design, and today's commercial place-and-route electronic design automation (EDA) tools, the coarse routing produced by the global router is typically at the granularity of two standard-cell row heights, or approximately 15 minimum-pitch units. The pitch unit is typically the contacted poly pitch (or, the Metal-1 (M1) pitch) or the Metal-x (Mx) metal pitch. Commercial place-and-route EDA tools are exemplified today by Cadence Design Systems' Innovus tool, Synopsys, Inc.'s IC Compiler 2 tool, Mentor Graphics' Nitro-SoC tool, and Avatar DA's Aprisa tool.

Today's commercial place-and-route EDA tools do not provide standard data formats or APIs through which users can import a global routing solution into the global-detailed routing flow. However, the ISPD-2018 Initial Detailed Routing Contest organized and conducted by Cadence Design Systems, Inc. (see S. Mantik, G. Posser, W. Chow, Y. Ding and W.-H. Liu, "ISPD 2018 Initial Detailed Routing Contest and Benchmarks", *Proc. ISPD*, 2018, pp. 140-143) is notable for defining and making public a route guide format for the global routing solution. The route guide format is a surrogate for the information and data structures by which the global routing solution is communicated to the detailed router within any of today's commercial place-and-route EDA tools.

The global router serves two very fundamental purposes during the creation of an IC's physical design. First, as mentioned, the global router creates coarse routes ("route guides" in the terminology of the ISPD-2018 Initial Detailed Routing Contest) that in practice restrict the solution space for detailed routing (S. Mantik, G. Posser, W. Chow, Y. Ding and W.-H. Liu, "ISPD 2018 Initial Detailed Routing Contest and Benchmarks", *Proc. ISPD*, 2018, pp. 140-143). Second, the global router provides early assessments of detailed routing feasibility via congestion maps, routing hotspot analyses, etc.

Global Routing Methods

Since the early 2000s, the EDA community has made a clear shift from congestion prediction (e.g., as congestion maps) to routability (design rule check violation, or DRC) prediction that tracks actual detailed routing outcomes (for an overview, see H.-Y. Chen and Y.-W. Chang, "Global and Detailed Routing", Chapter 12 in L.-T. Wang, Y.-W. Chang and K.-T. Cheng (Eds.), *Electronic Design Automation: Synthesis, Verification, and Test*, Morgan Kaufmann, 2009). The ISPD07 Contest developed new total overflow and maximum overflow metrics to assess global route solution quality (see e.g., G.-J. Nam, C. Sze and M. Yildiz, "The ISPD Global Routing Benchmark Suite", *Proc. ISPD*, 2008, pp. 156-159; and G.-J. Nam, M. Yildiz, D. Z. Pan and P. H. Madden, "ISPD Placement Contest Updates and ISPD 2007 Global Routing Contest", *Proc. ISPD*, 2007, pp. 167-167). Subsequently, the DAC-2012 contest developed peak weighted congestion and routing congestion metrics, which have had strong impact on academic research efforts (N. Viswanathan, C. J. Alpert, C. Sze, L. Zhuo and Y. Wei, "The DAC 2012 routability-driven placement contest and benchmark suite", *Proc. DAC*, 2012, pp. 774-782). Alpert et al. propose metrics of pin existence cost, pin area cost and pin resolution cost to identify hotspots that cause pin access, short or other design rule violations (T. Taghavi, Z. Li, C. J. Alpert, G.-J. Nam, A. Huber and S. Ramji, "New Placement Prediction and Mitigation Techniques for Local Routing Congestion", *Proc. ICCAD*, 2010, pp. 621-624). Seo et al. propose remaining pin access and inaccessibility of cell metrics for standard-cell layouts as well as detailed placement (J. Seo, J. Jung, S. Kim and Y Shin, "Pin accessibility-driven cell layout redesign and placement optimization", *Proc. DAC*, 2017, pp. 54:1-54:6

Each of the above proposals include metrics that drive the global router without a direct connection to detailed routing. The ICCAD-2019 LEF/DEF-based Open-Source Global Routing Contest departed from this unconnected approach: it connected for the first time academic global routing research to direct evaluation by a specific, highly-capable academic detailed router, leveraging the ISPD-2018 route guide format (S. Dolgov, A. Volkov, L. Wang and B. Xu, "2019 CAD Contest: LEF/DEF Based Global Routing", *Proc. ICCAD*, 2019. DOI: 10.1109/IC-CAD45719.2019.8942107; and H. Li, G. Chen, B. Jiang, J. Chen and E. F. Y. Young, "Dr. CU 2.0: A Scalable Detailed Routing Framework with Correct-by-Construction Design Rule Satisfaction", *Proc. ICCAD*, 2019, pp. 1-7).

Detailed Routing Methods

Detailed routing delivers design-rule correct place-and-route results. The detailed routing task is highly complex and has grown more so with each new manufacturing process technology generation, or "node". The ISPD-2018 (S. Mantik, G. Posser, W. Chow, Y. Ding and W.-H. Liu, "ISPD 2018 Initial Detailed Routing Contest and Benchmarks", Proc. ISPD, 2018, pp. 140-143) and ISPD-2019 (W.-H. Liu, S. Mantik, W. Chow, Y. Ding, A. Farshidi and G. Posser, "ISPD 2019 Initial Detailed Routing Contest and Benchmark with Advanced Routing Rules", *Proc. ISPD*, 2019, pp. 147-151) Initial Detailed Routing Contests pioneered the communication of global routing solutions to the detailed router via the public "route guide" format. The ISPD18/19 route guide format has since emerged as a new and concrete link between academic global routers and academic detailed routers. As noted above, commercial place-and-route EDA tools do not expose such a link to users, but the traditional sequencing of global and detailed routing steps is very much present within each tool.

Genetic and Evolutionary Methods

A rich subset of the VLSI CAD literature has studied the genetic or evolutionary metaheuristic (a high-level problem-independent algorithmic framework that provides a set of guidelines or strategies to develop heuristic optimization algorithms) paradigm for combinatorial global optimizations (see J. H. Holland, *Adaptation in Natural and Artificial Systems*, MIT Press, 1975); this literature includes several works that study routing steps of physical implementation. The book by Mazumder and Rudnick (P. Mazumder and E. M. Rudnick, *Genetic Algorithms for VLSI Design, Layout & Test Automation*, Upper Saddle River, N.H., Prentice Hall PTR, 1999) and the review chapter of Cohoon et al. (J. Cohoon, J. Kairo and J. Lienig, "Evolutionary Algorithms for the Physical Design of VLSI Circuits", in A. Ghosh and S. Tsutsui, eds., *Advances in Evolutionary Computing: Theory and Algorithms*, Springer, 2003, pp. 683-712) provide excellent surveys of the state of the field up to the early 2000s.

Works of Esbensen, Schnecke and Vornberger, and Ravikumar et al. all develop genetic algorithms (GAs) in the macro block context (H. Esbensen, "A Macro-Cell Global Router Based on Two Genetic Algorithms", *Proc. EuroDAC*, 1994, pp. 428-433; V. Schnecke and O. Vornberger, "An Adaptive Parallel Genetic Algorithm for VLSI Layout Optimization", *Parallel Problem Solving from Nature* (H. P. Schwefel and R. Manner, eds.), Springer Verlag Lecture Notes in Computer Science 1141 (1996), pp. 859-868. (Also: "A Genetic Algorithm for VLSI Physical Design Automation", March 1996; and D. Ravikumar, A. Raaza, V. Devi and E. Gopinathan, "A Genetic Algorithm Approach for Global Routing of VLSI Circuits", *Intl. J. of Engineering and Technology* 7 (2018), pp. 394-397). The earliest of these, by Esbensen, proposes a two-phase genetic approach, with the first GA stage producing candidate Steiner routes for nets, and the second GA stage selecting from available routes for all the nets in the design. The most recent work by Ravikumar et al. also focuses on the Steiner tree problem in channel intersection graphs and "the macro-cell design style", with no testcases or results described. Other works such as that of Lienig and Thulasiraman have studied the genetic approach for the channel routing problem (J. Lienig and K. Thulasiraman, "A Genetic Algorithm for Channel Routing in VLSI Circuits", *Evolutionary Computation* 1(4) (1994), pp. 293-311).

Our review of the routing-specific GA literature confirms an observation made by the authors of Cohoon et al. (J. Cohoon, J. Kairo and J. Lienig, "Evolutionary Algorithms for the Physical Design of VLSI Circuits", in A. Ghosh and S. Tsutsui, eds., *Advances in Evolutionary Computing: Theory and Algorithms*, Springer, 2003, pp. 683-712): "Contrary to placement, where numerous evolutionary algorithms have been published, there have not been as many successful publications of evolutionary routing algorithms. This condition seems to be a consequence of the larger complexity of the routing task. In particular, the appropriate coding of the routing poses a major obstacle with the result that almost all publications in this field are limited by specific constraints induced by the encoding."

An important observation is that the modern compute landscape (multi-core architectures and abundant computational resources available from cloud providers) has fundamentally changed the nature of the IC design environment, just as the modern IC routing problem has grown more urgent to solve. Ajayi et al. observe that use of parallel/distributed search and optimization to "leverage available compute resources (e.g., cloud) to maximize design outcomes within resource limits" will be a basic underpinning of future automated design technology (T. Ajayi, D. Blaauw, T.-B. Chan, C.-K. Cheng, V. A. Chhabria, D. K. Choo, M. Coltella, S. Dobre, R. Dreslinski, M. Fogaca, S. Hashemi, A. Hosny, A. B. Kahng, M. Kim, J. Li, Z. Liang, U. Mallappa,

5

P. Penzes, G. Pradipta, S. Reda, A. Rovinski, K. Samadi, S. S. Sapatnekar, L. Saul, C. Sechen, V. Srinivas, W. Swartz, D. Sylvester, D. Urquhart, L. Wang, M. Woo and B. Xu, "OpenROAD: Toward a Self-Driving, Open-Source Digital Layout Implementation Tool Chain", *Proc. GOMACTech,* 2019, pp. 1105-1110). Kahng (A. B. Kahng, "INVITED: Reducing Time and Effort in IC Implementation: A Roadmap of Challenges and Solutions", *Proc. DAC,* 2018) notes that the so-called adaptive multi-start technique is a potential approach to leveraging modern compute resources for VLSI CAD optimizations. (See K. D. Boese, A. B. Kahng and S. Muddu, "New Adaptive Multistart Techniques for Combinatorial Global Optimizations", *Operations Research Letters* 16(2) (1994), pp. 101-113; and L. Hagen and A. B Kahng, "Combining Problem Reduction and Adaptive Multi-Start: A New Technique for Superior Iterative Partitioning", *IEEE Trans. on CAD* 16(7) (1997), pp. 709-717.) A hybridization approach to finding global routing solutions is shown in FIG. 1, taken from A. B. Kahng, "INVITED: Reducing Time and Effort in IC Implementation: A Roadmap of Challenges and Solutions", Proc. DAC, 2018. In the figure, an original population of starting points for optimization (101) leads to corresponding local optima (104). Based on these local optima, an improved population of starting points can be synthesized at each generation, with each generation's corresponding local optima achieving improved solution quality (103) within the overall optimization cost landscape (102).

Preferred hybrid embodiments of the present invention avoid pitfalls of prior global routers. The fact that the global routing in practice restricts the detailed router's solution space means that good global routes make detailed routing practically feasible, but bad global routes are difficult for the detailed router to recover from. A good routing indicates that the following detailed routing run ends with an acceptably low number of design rule check violations (DRCs). Current global routing solutions often fail to provide sufficiently high-quality guidance to detailed routing. Bad routings are costly, unpredictable failures (i.e., unacceptably poor-quality solutions that cannot be fixed, and must be discarded) at the end of detailed routing. For example, if DR fails with a significant number of DRCs, engineer typically return to a step earlier than GR to reduce the congestion of the standard cells placement. If there are 100 to a few hundreds of DRCs, the engineer will manually reroute and fix. If a problem is found with a specific layer, GR capacity usage is typically reduced for the specific layer. With VLSI routings, such steps add cost and complexity because a typical GR for a VLSI includes at least multiple iterations of routing and a typical DR includes tens of iterations of routing.

SUMMARY OF THE INVENTION

A preferred embodiment provides a method for automatically creating a global routing solution for an integrated circuit. The method includes generating an original population of GR solutions. In one or more subsequent phases the method generates succeeding populations of GR solutions. The generation of each succeeding population includes determining a plurality of base GR solutions from the current population of GR solutions, determining a plurality of DRC hotspot areas within the plurality of base GR solutions, determining a plurality of patching GR solutions from which patches may be extracted, and hybridizing patching of GR solutions into base GR solutions.

6 optimization iteration (adapted from A. B. Kahng, "INVITED: Reducing Time and Effort in IC Implementation: A Roadmap of Challenges and Solutions", *Proc. DAC,* 2018).

Figure 1:
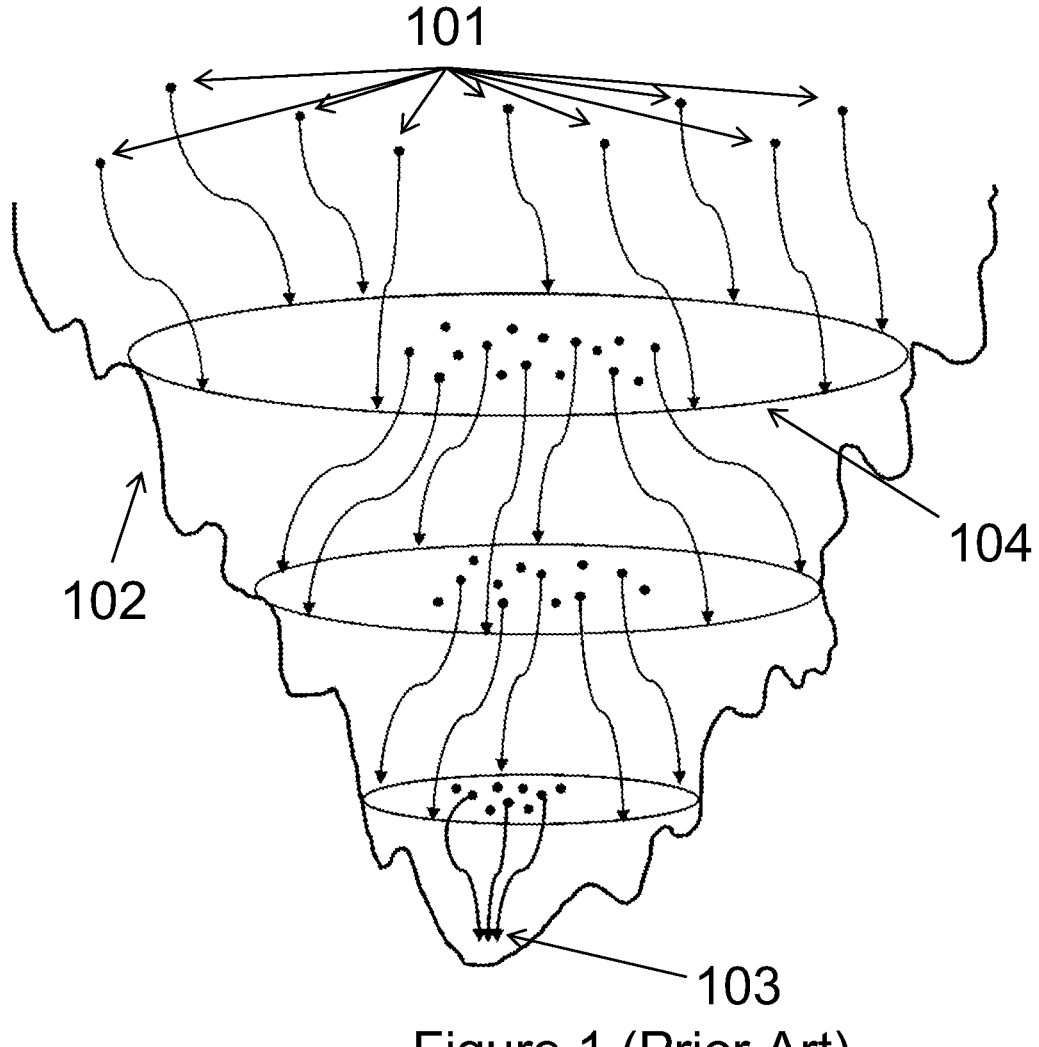
FIG. 1 (Prior Art) shows an adaptive multistart approach that chooses better starting points for each of the next
Figure 2:
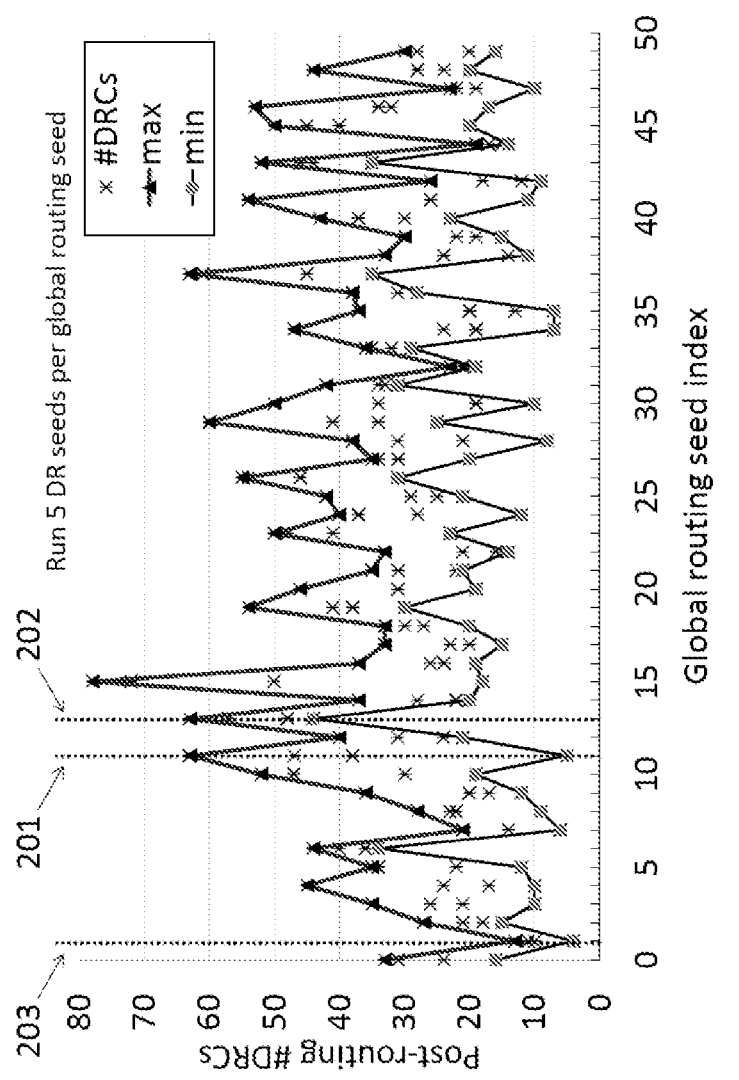

FIG. 2 shows a study of a preferred method for hybrid global routing applied to a congested ISPD-2018 Contest benchmark testcase on the post-routing #DRC diversity, based on application of global and detailed routing seeds.

Figures 3A, 3B:
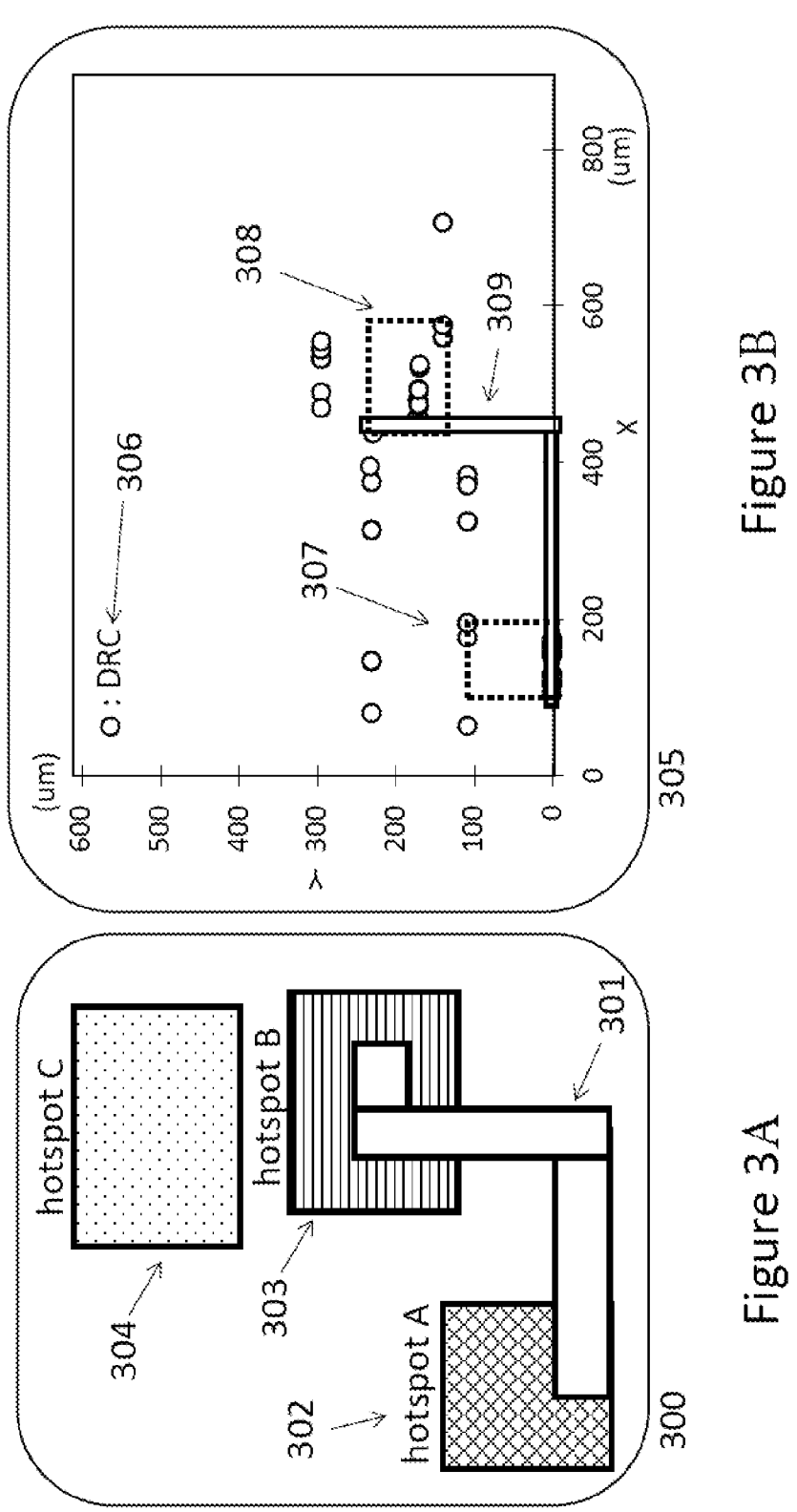

FIGS. 3A and 3B show, in a preferred method for global routing, (A) an illustration of a long-net's "crossing" in two hotspots, which is a case that must be considered when combining base and patches; and (B) an example from the benchmark ispd18_test4 (from the ISPD-2018 initial detailed routing contest: S. Mantik, G. Posser, W. Chow, Y. Ding and W.-H. Liu, "ISPD 2018 Initial Detailed Routing Contest and Benchmarks", *Proc. ISPD,* 2018, pp. 140-143).

Figures 4A, 4B:
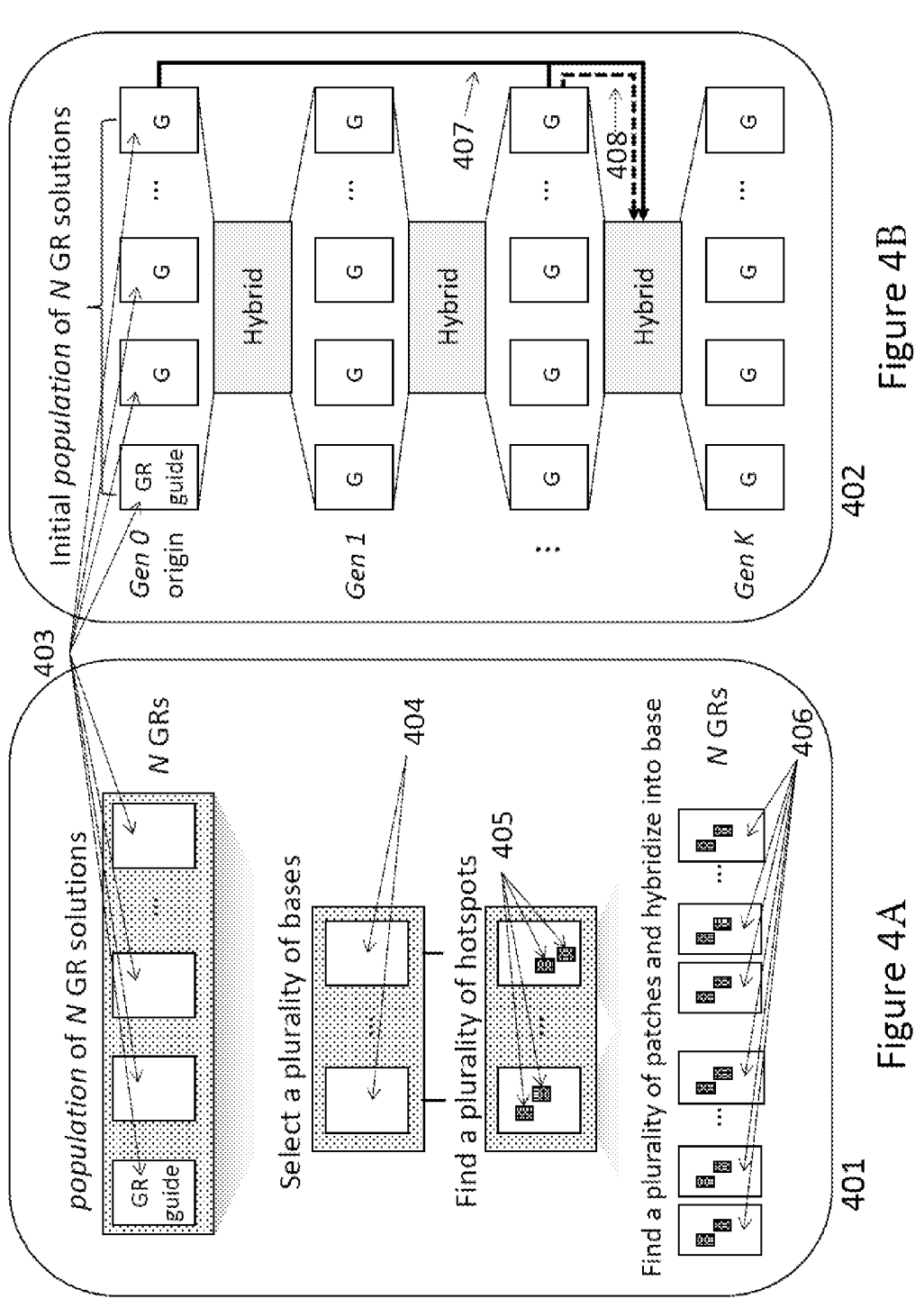

FIGS. 4A and 4B show (A) an illustration of a preferred exemplary hybridization methodology for one generation and (B) a genetic metaheuristic flow (a metaheuristic flow that combines genetic techniques) for superior GR solutions over multiple generations. In each generation, N hybrid children are produced from parents in the previous generation(s). Approach 1 (407, solid arrows) hybridizes from both the immediately previous generation and the original generation Gen 0 (403). Approach 2 (408, dashed arrows) uses only the previous generation as parents; this can lead to more rapid evolutionary stasis and inferior results.

Figure 5:
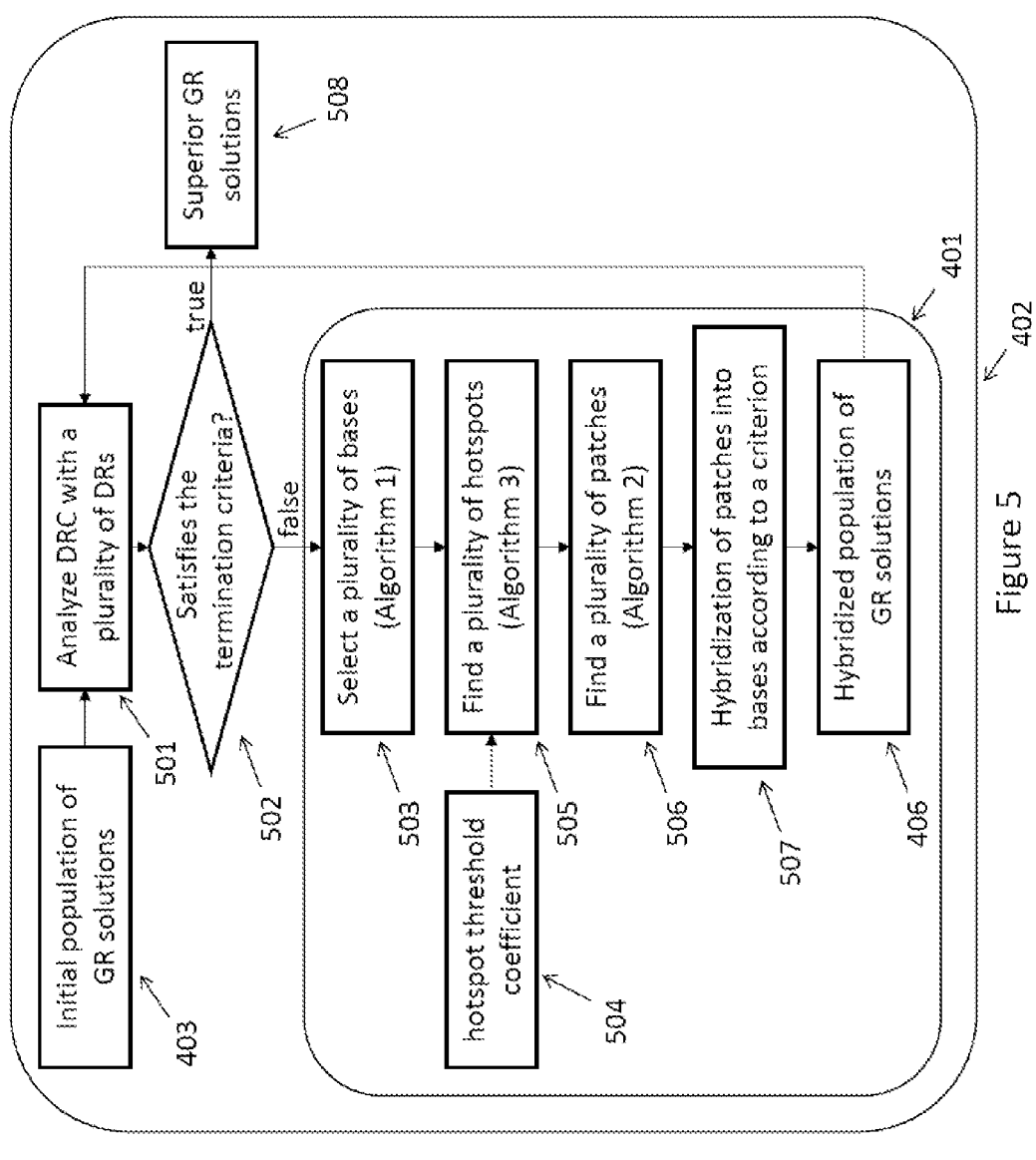
Figure 6A:
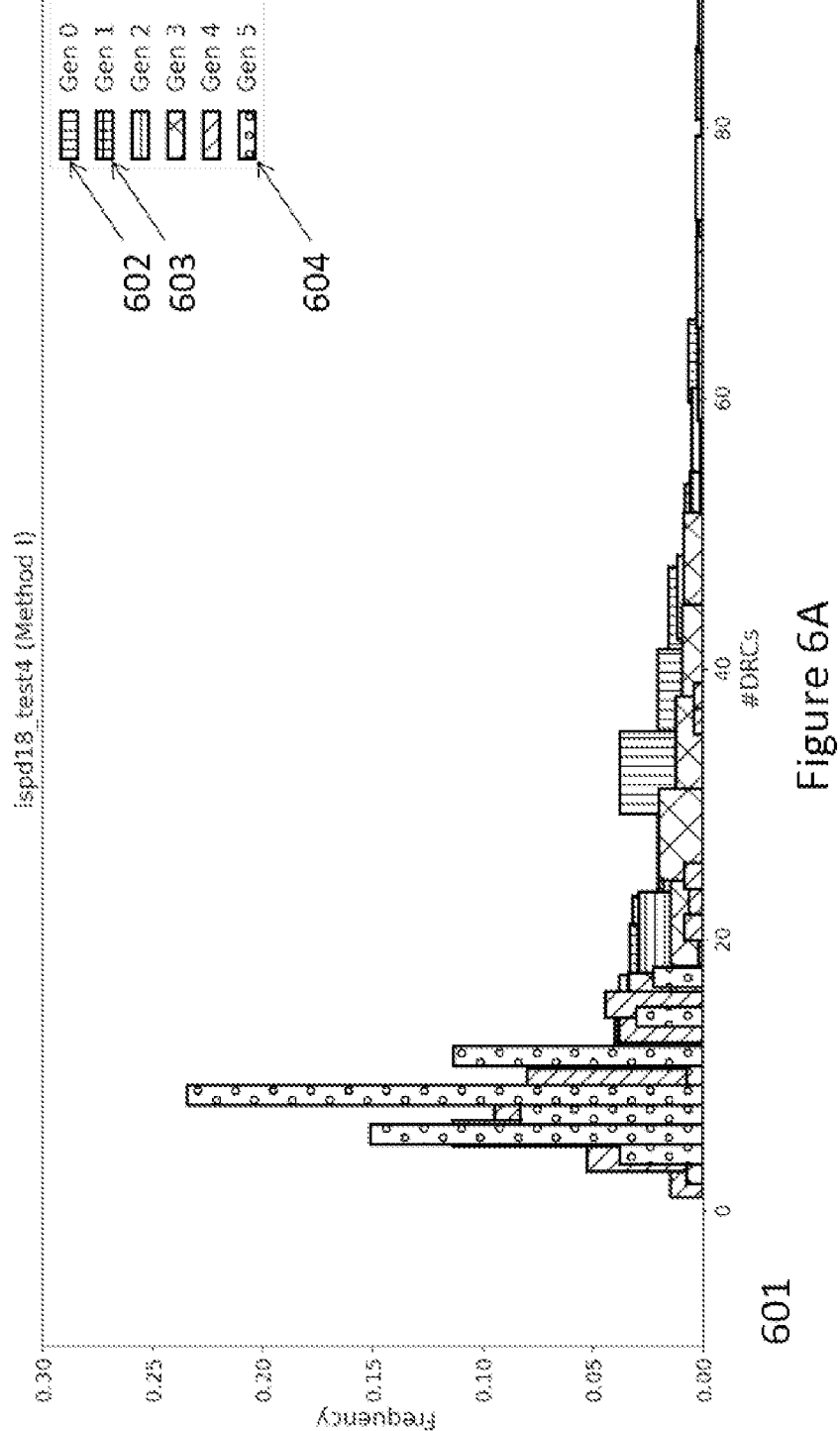
Figure 6B:
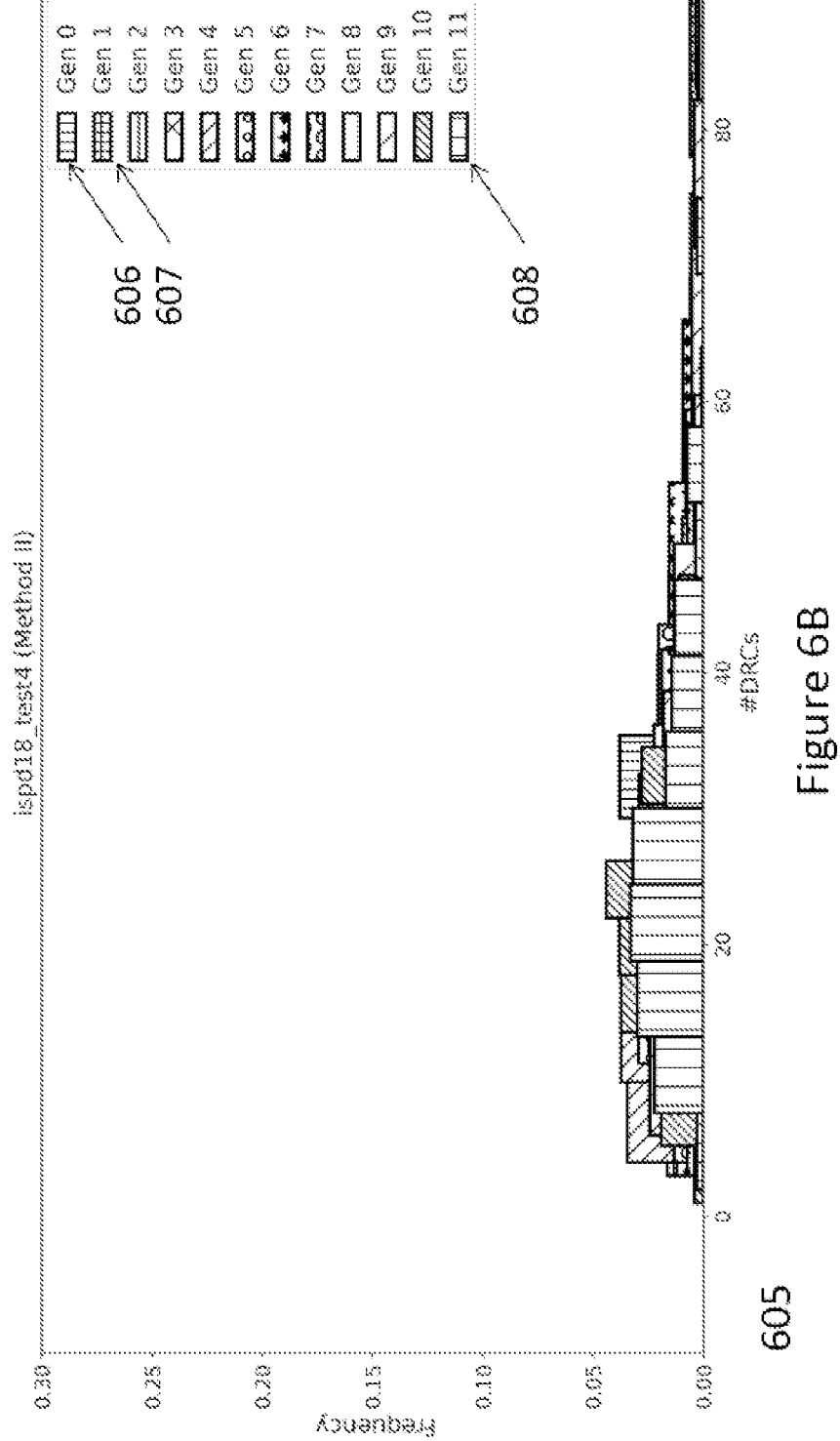
Figure 6C:
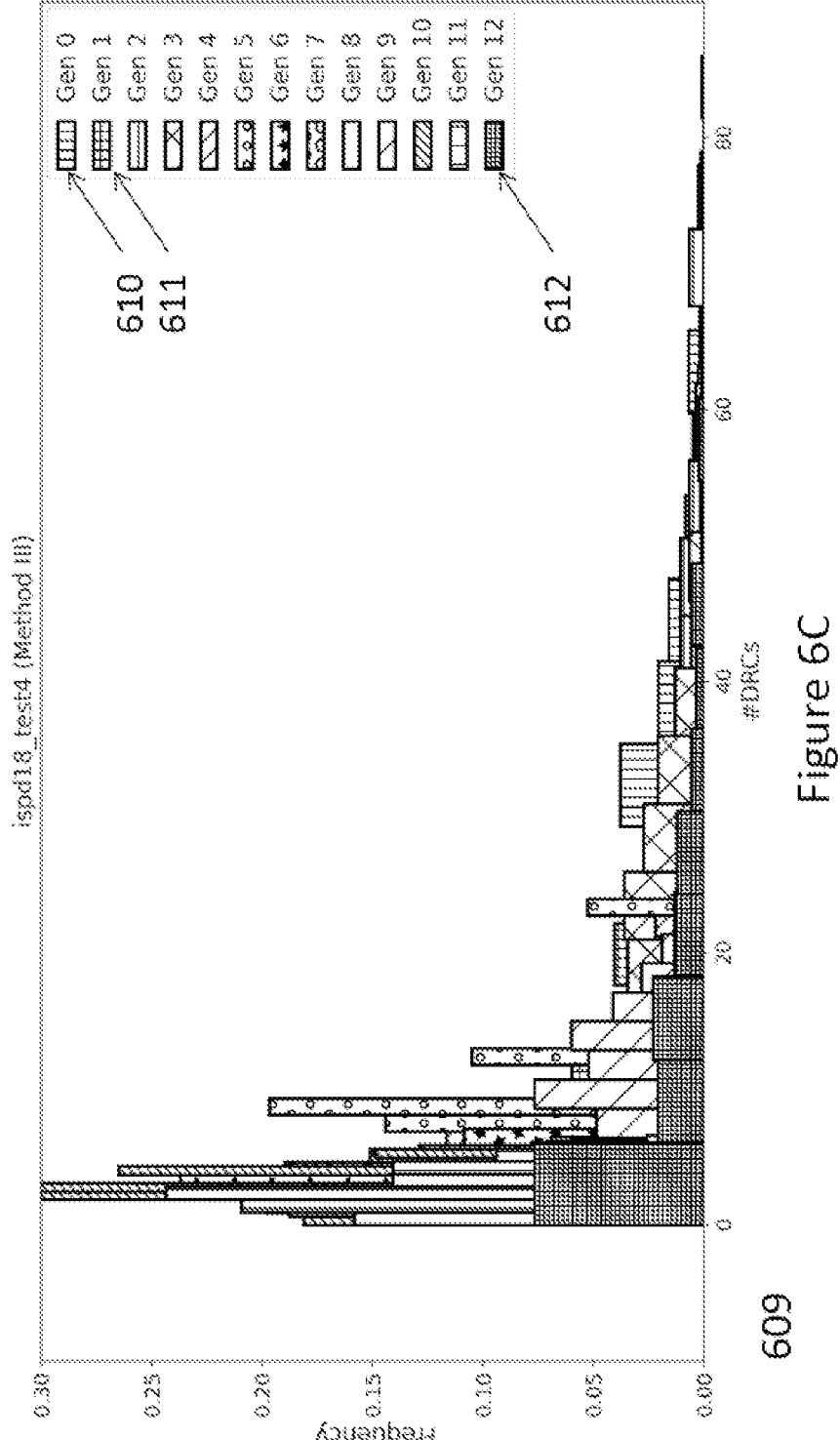
Figure 6D:
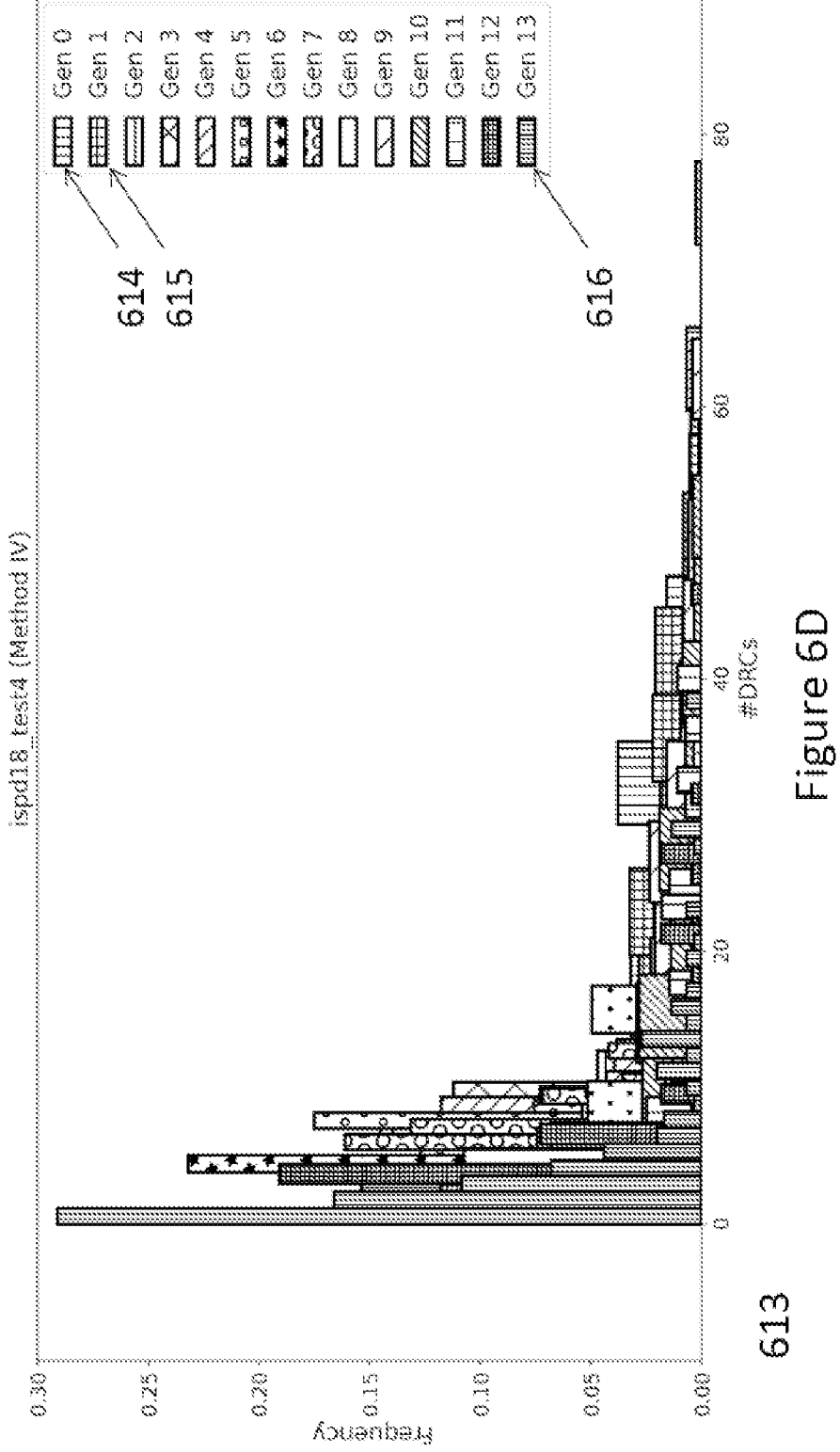
Figure 7A:
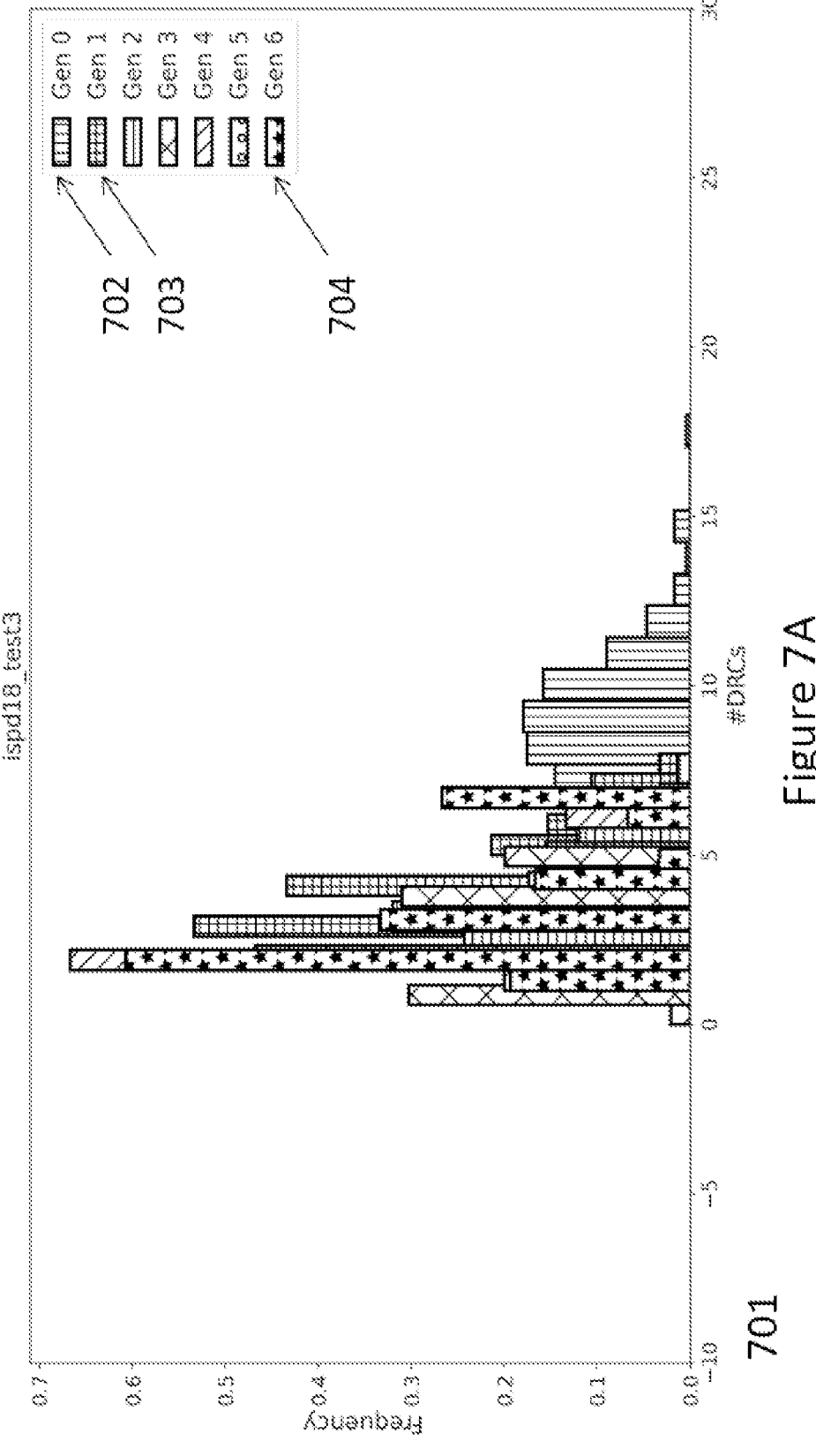
Figure 7B:
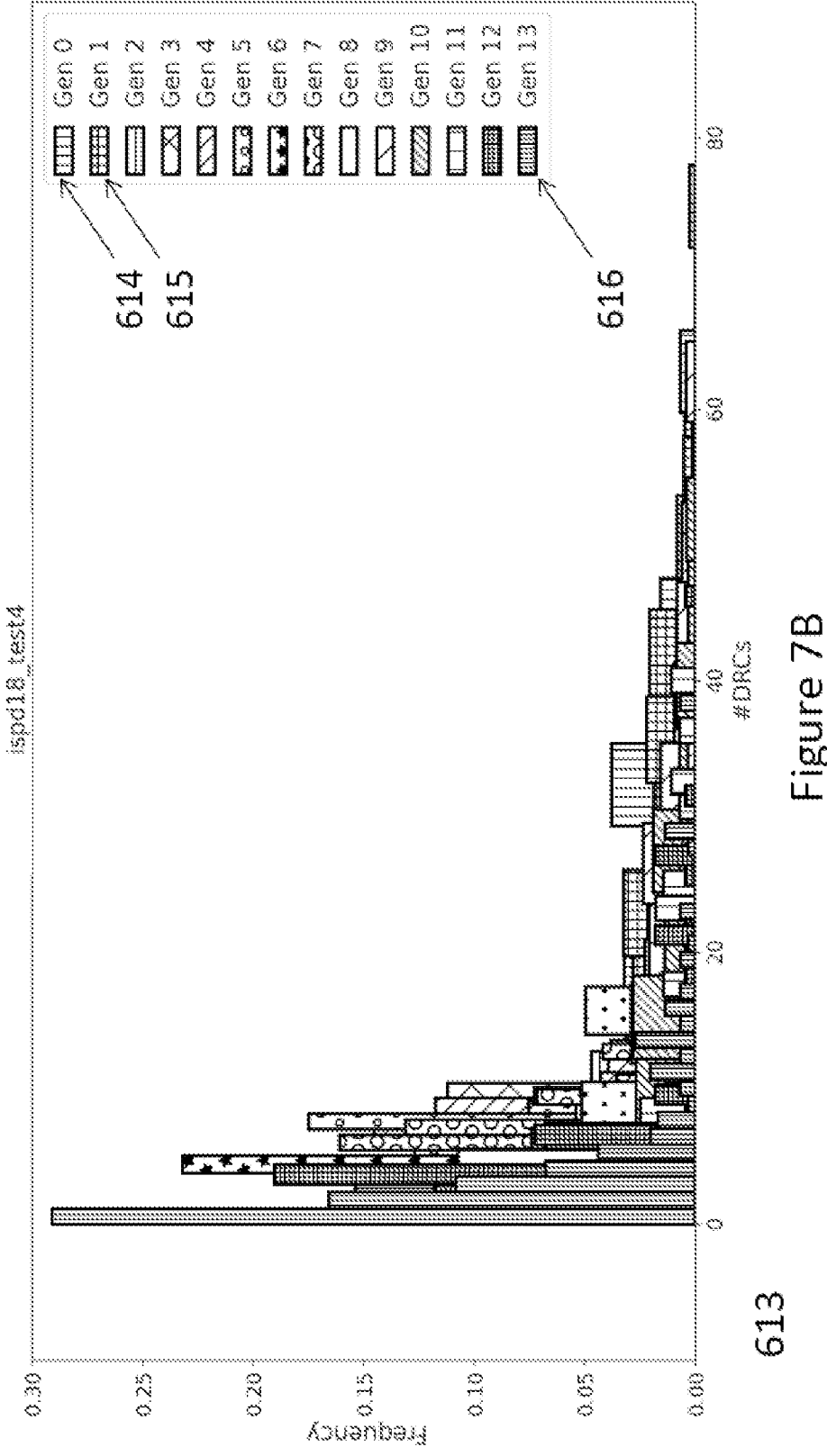
Figure 7C:
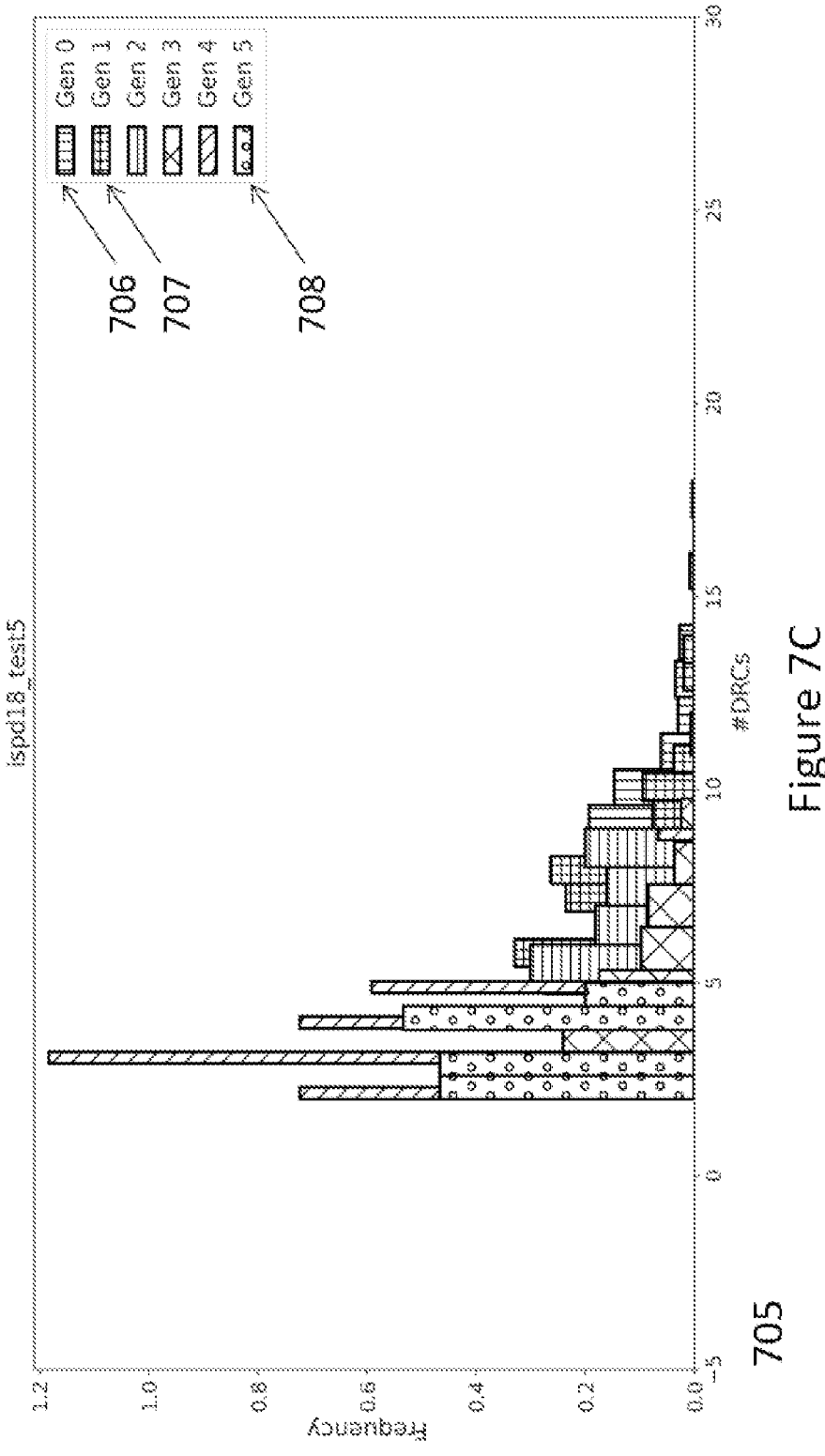
Figure 7D:
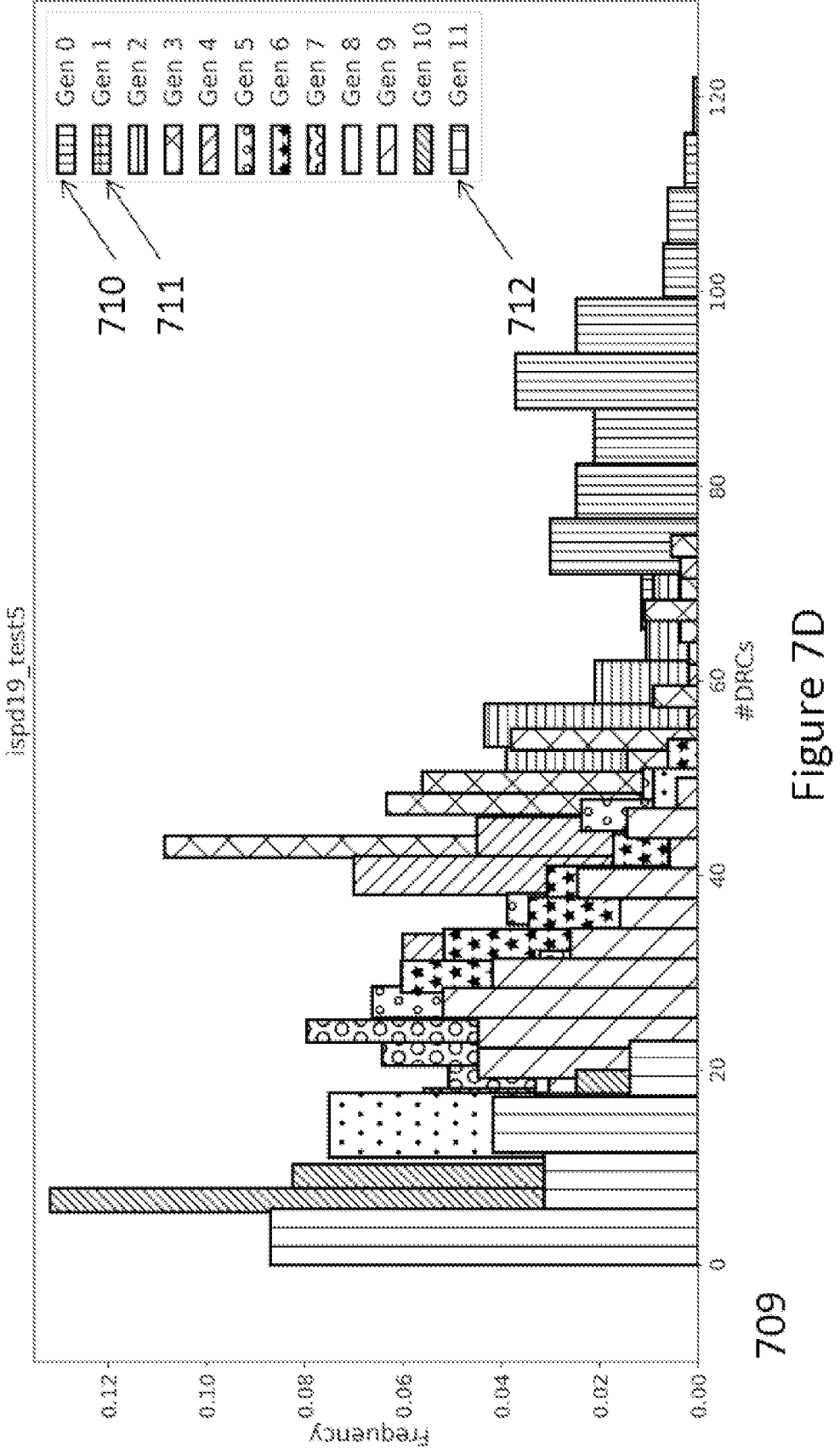

FIG. 5 is a flow chart illustrating a preferred embodiment genetic metaheuristic flow that produces a new hybridized population of GR solutions in each successive generation, leading to superior GR solutions.

FIGS. 6A-6D shows a comparison of #DRC distributions of four different long-net assignment methods for the preferred embodiment genetic metaheuristic flow. FIGS. 6A, 6B, 6C and 6D respectively show Method I, Method II, Method III and Method IV.

FIGS. 7A-7D show the #DRC distributions of the preferred genetic metaheuristic flow. FIGS. 7A, 7B, 7C and 7D show the results of ispd18_test3, ispd18_test4, ispd18_test5 and ispd19 test5, respectively.

Figure 8A:
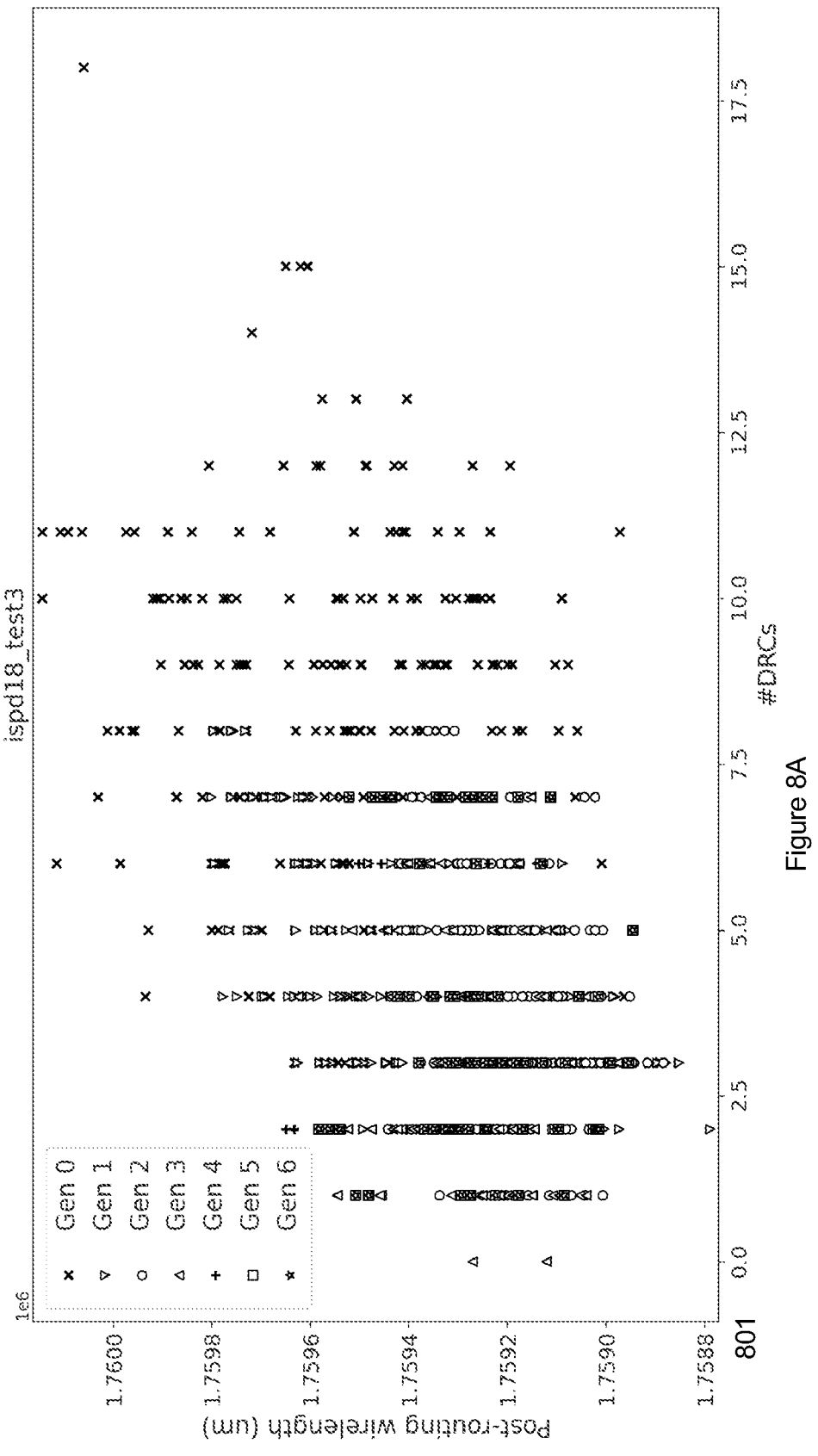
Figure 8B:
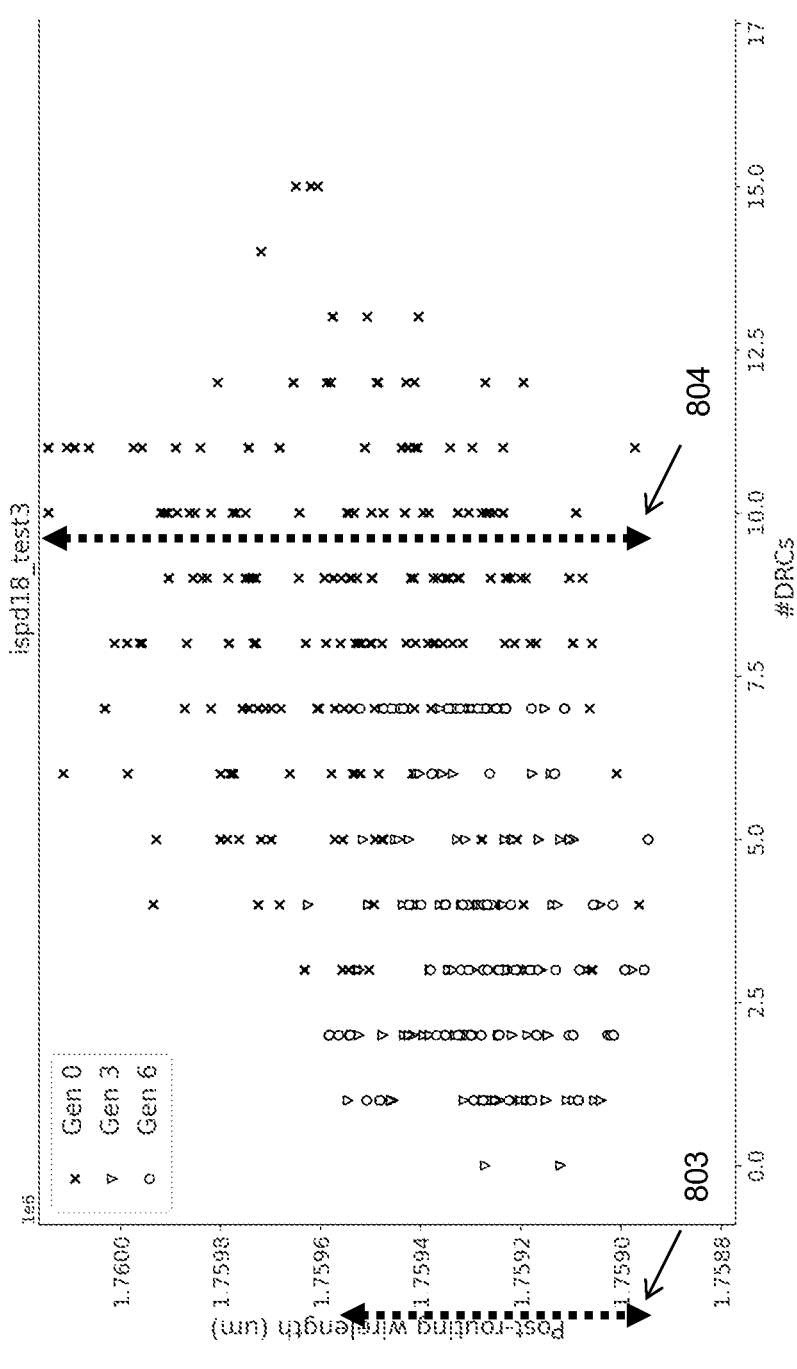
Figure 8C:
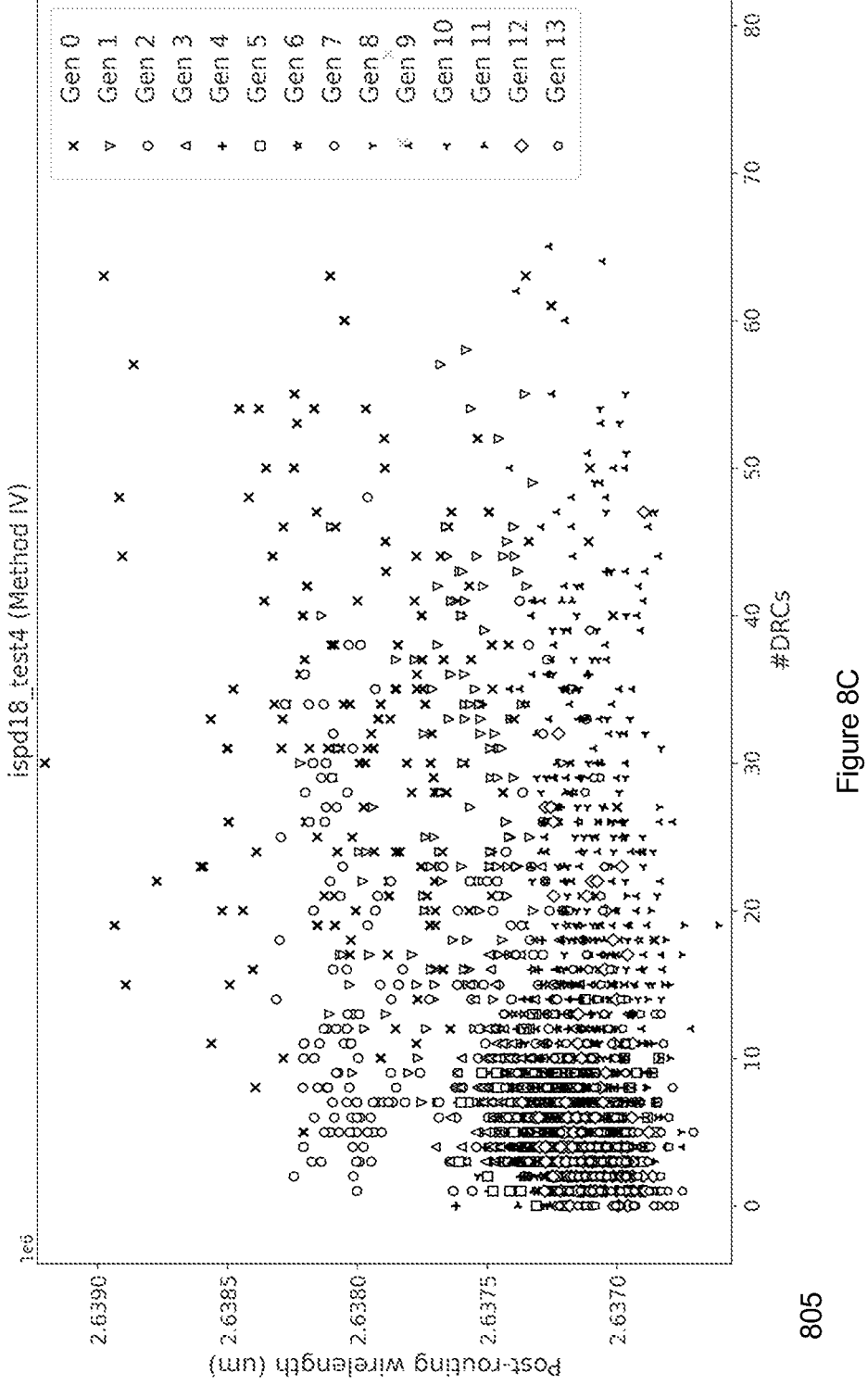
Figure 8D:
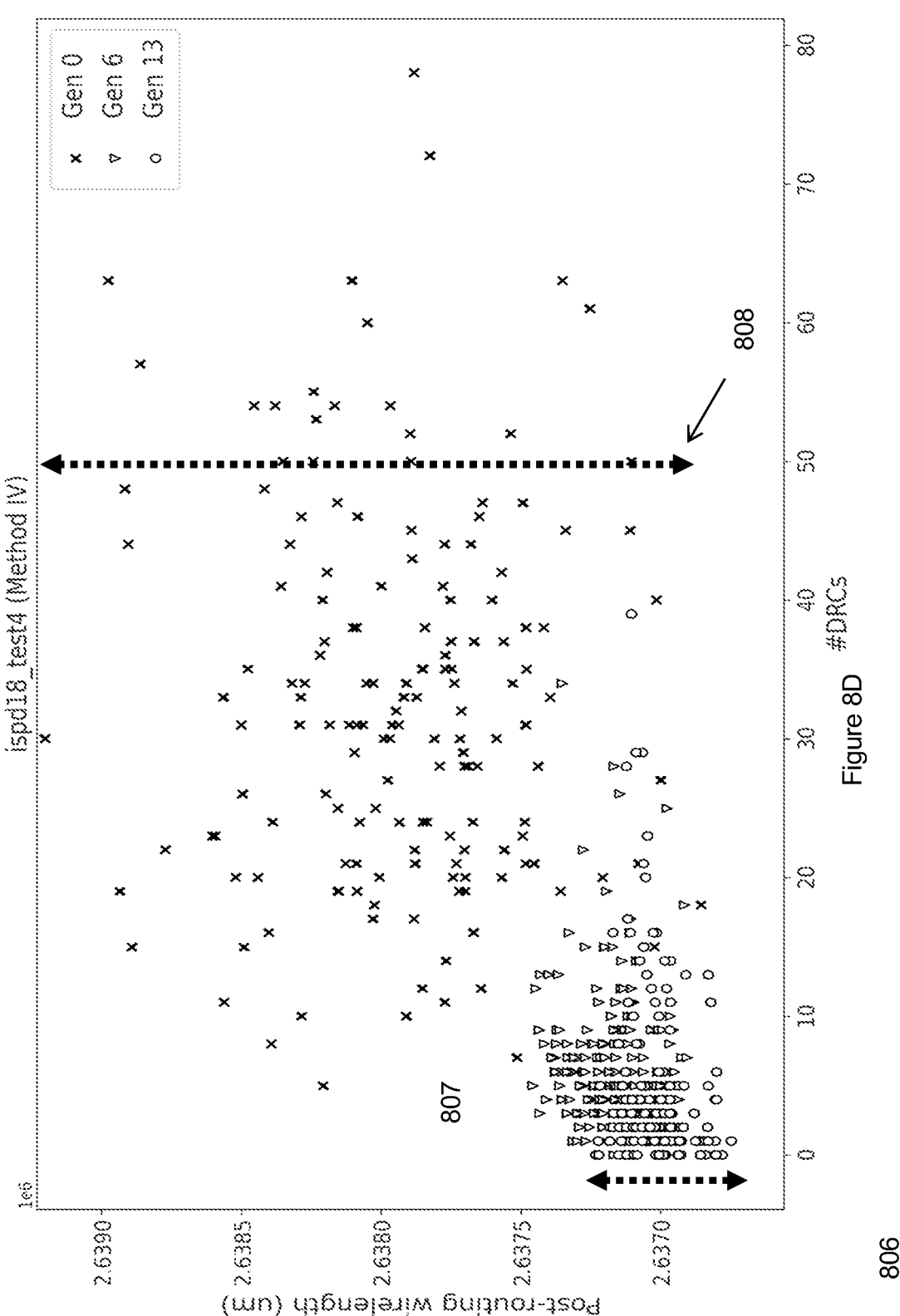
Figure 8E:
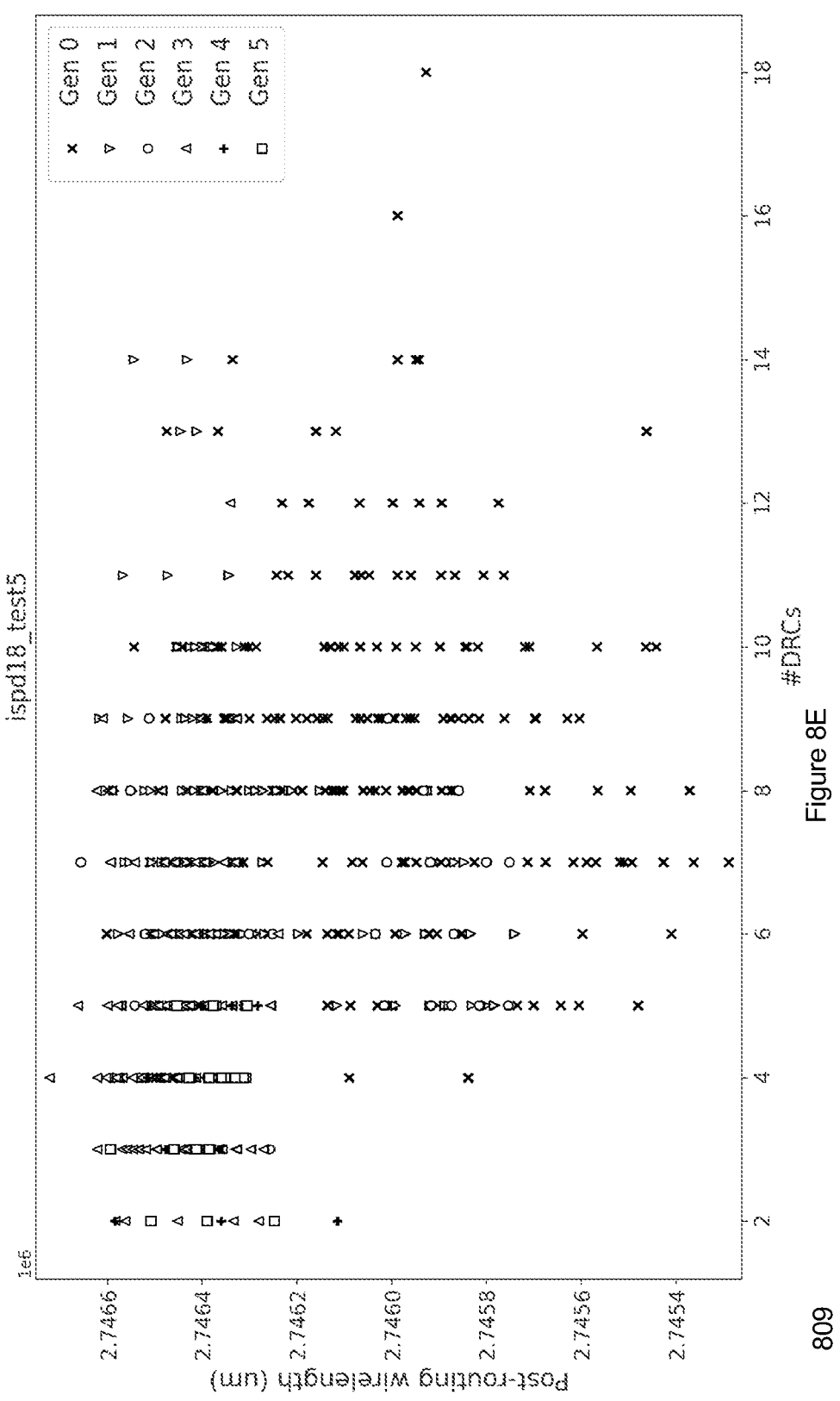
Figure 8F:
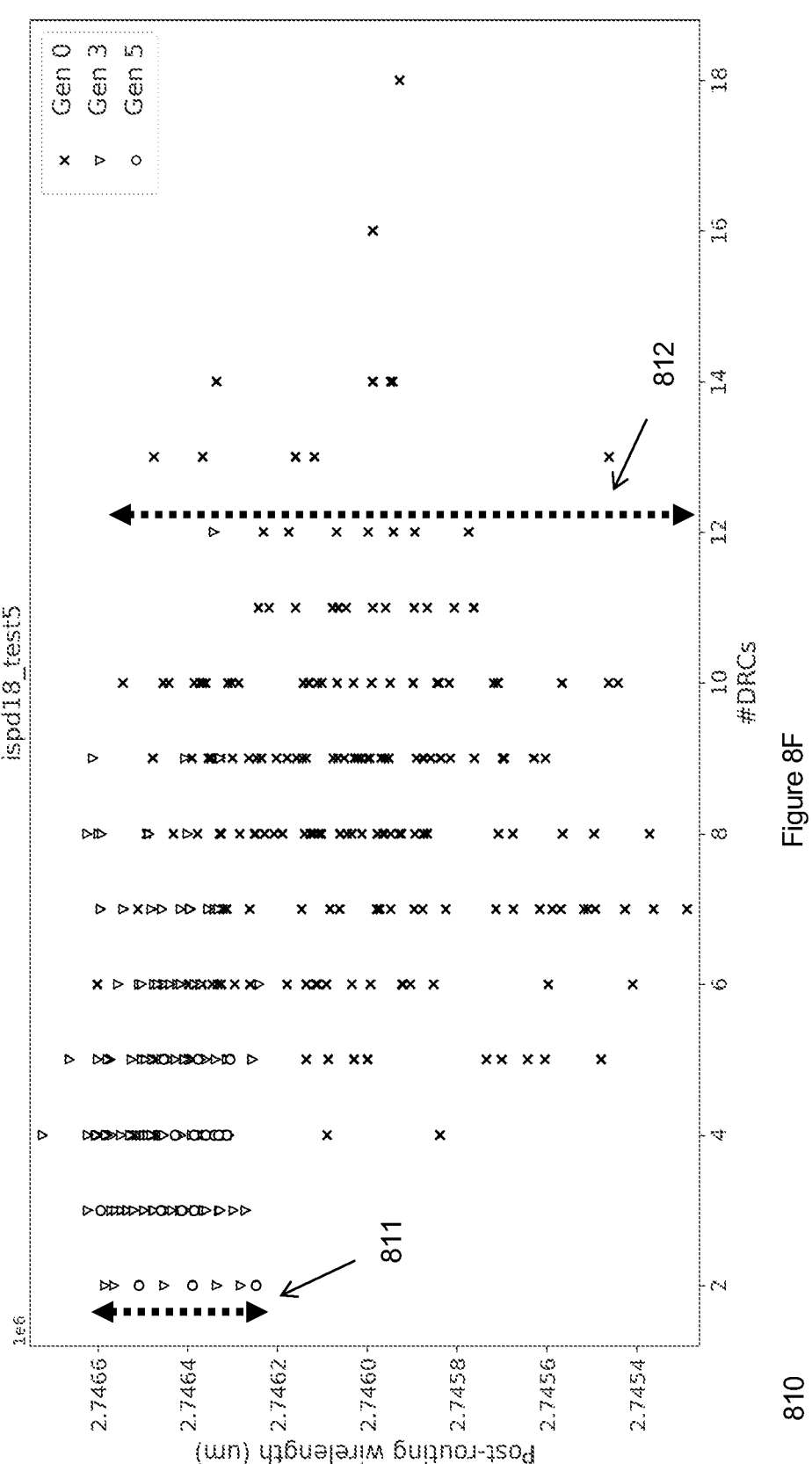
Figure 8G:
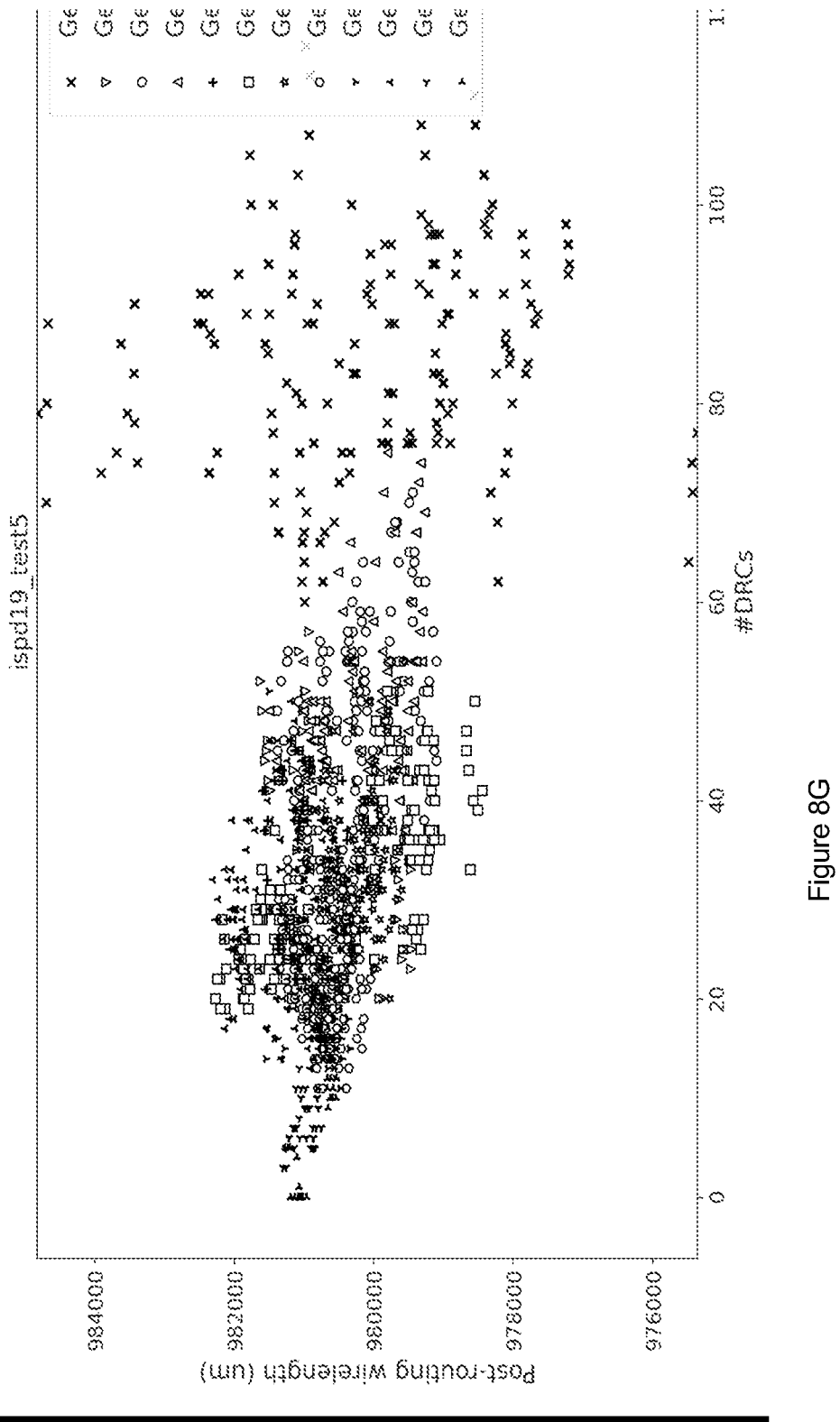
Figure 9A:
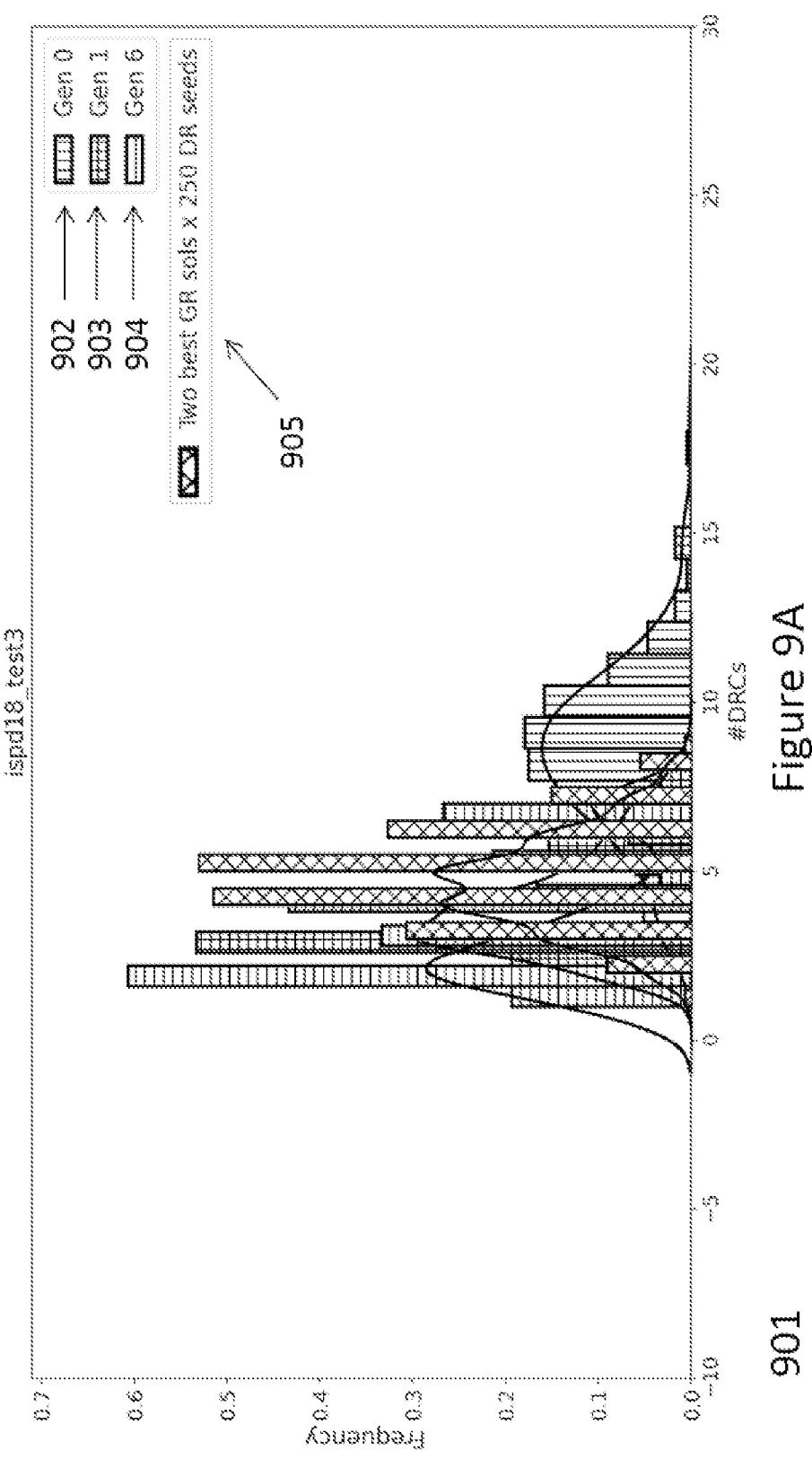
Figure 9B:
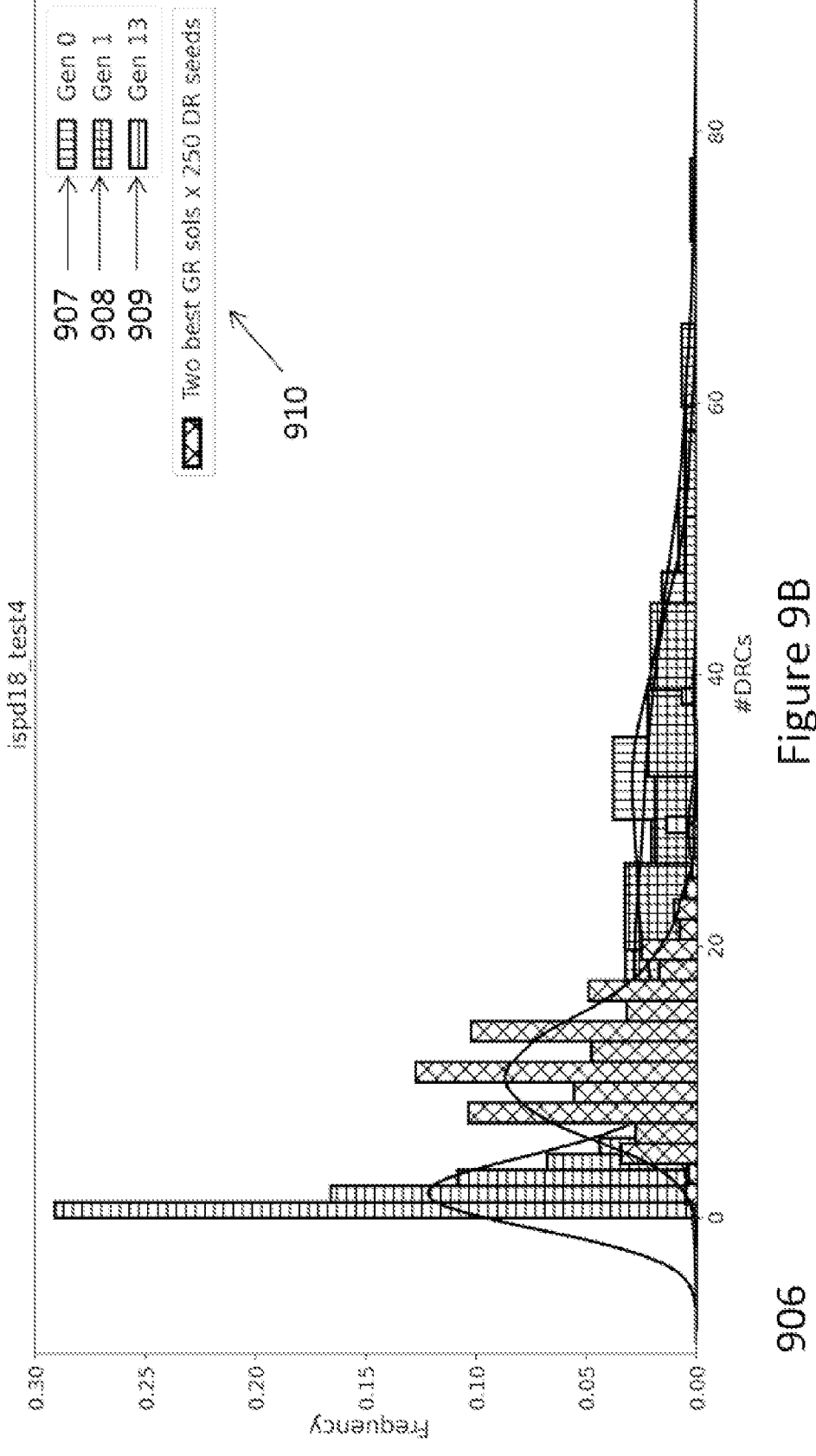
Figure 9C:
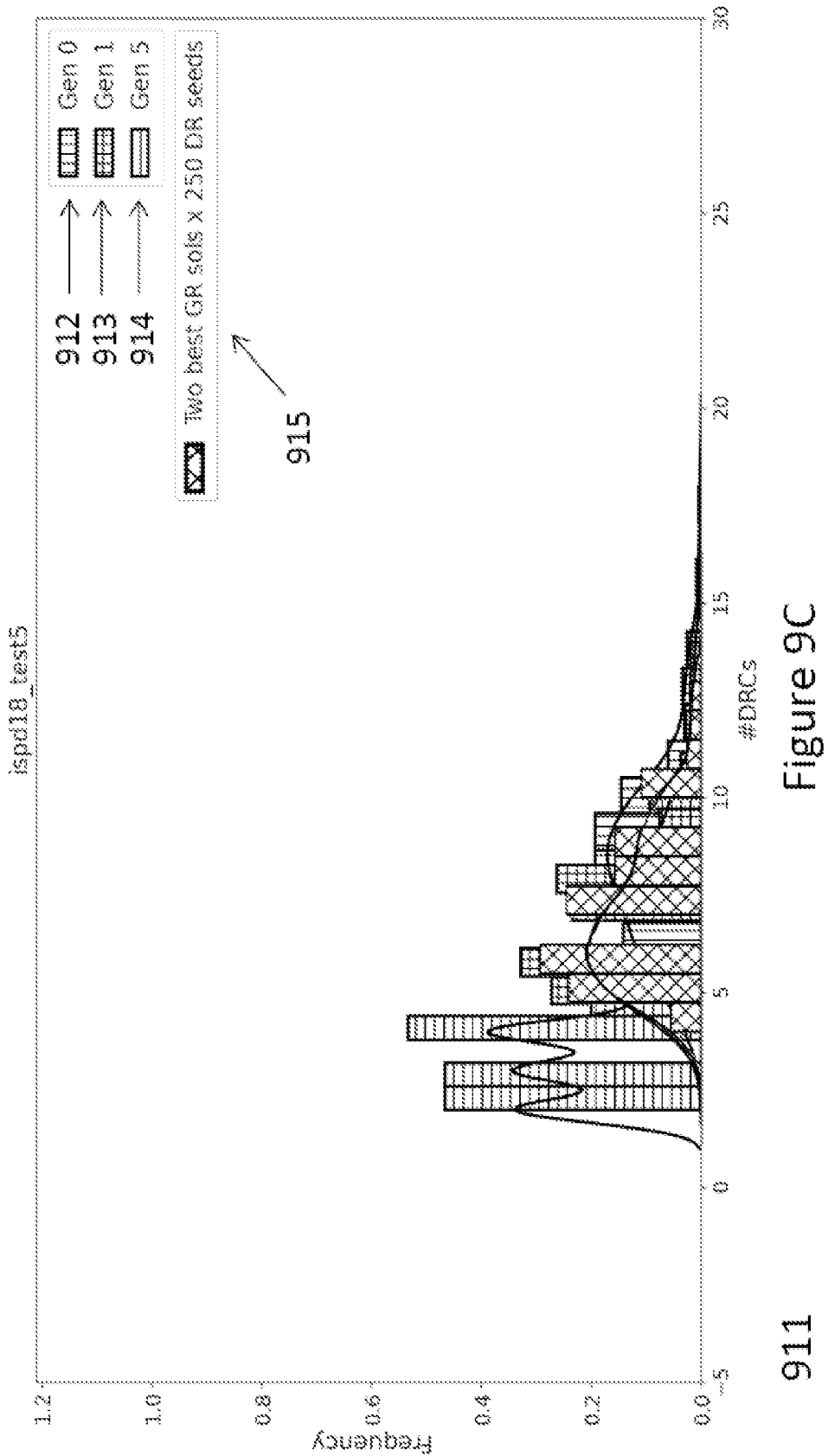
Figure 9D:
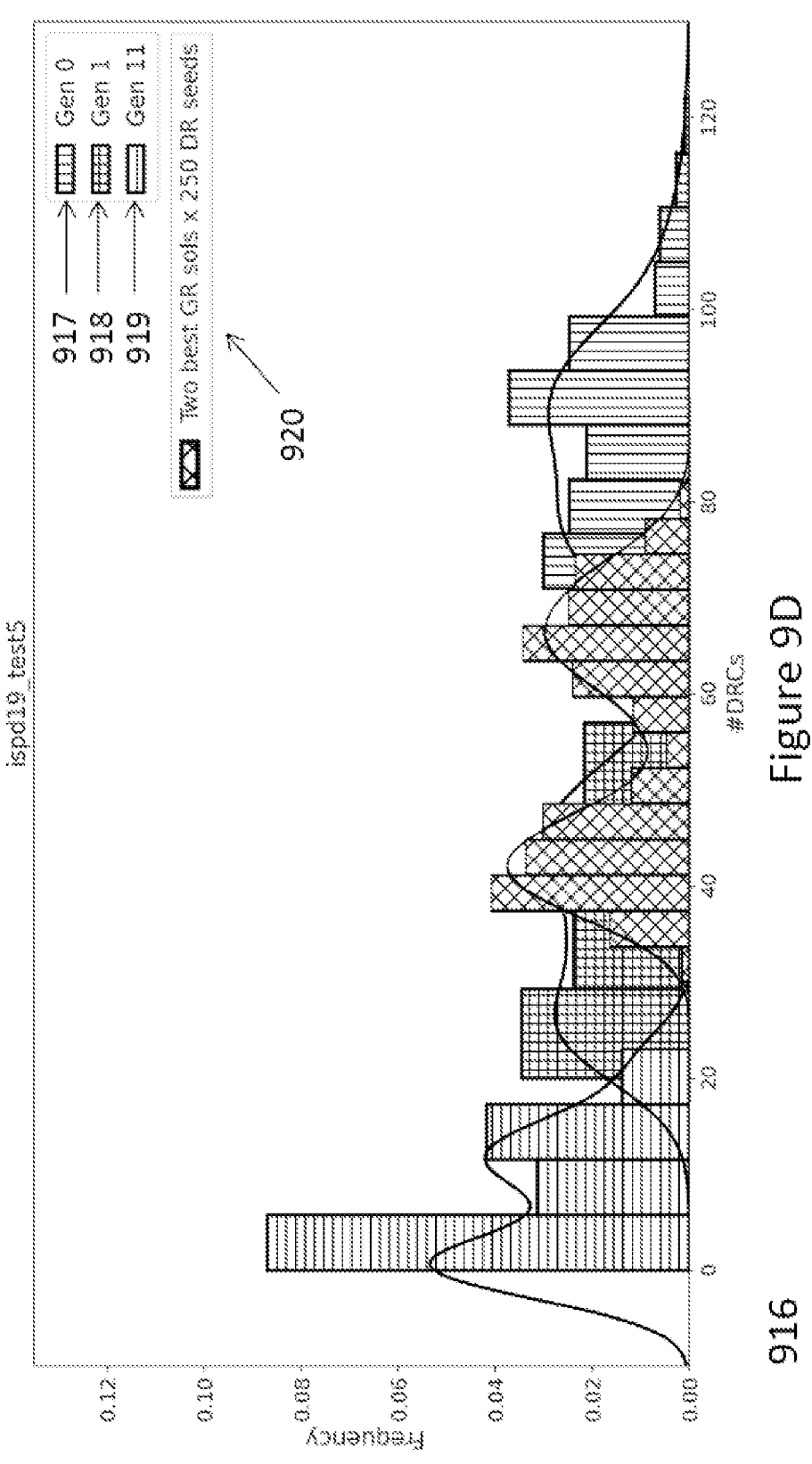

FIGS. 8A-8G show a comparison of per-generation #DRC and post-routing wirelength distributions for the preferred genetic metaheuristic flow. Dashed arrows indicate the ranges of wirelength distribution of the first and the last generations. FIGS. 8A-8B show the results of ispd18_test3, FIGS. 8C-8D show the results of ispd18_test4, and FIGS. 8E-8G show the results of of ispd18_test5 and ispd19 test5. The upper graph in each figure shows the #DRC and wirelength distributions for all generations, and the lower graph in each figure shows only the initial, middle and last generations for clearer visualization.

FIGS. 9A-9D show a comparison of #DRC distributions and Kernel density estimation curves for the preferred genetic metaheuristic flow based on (A) DR with Gen 0 GR solutions; (B) DR with Gen 1 GR solutions; (C) DR based on the two best GR solutions from Gen 0, with iso-DR-computing resource of one Hybridization generation; and (D) DR with final generation GR solutions, respectively the results of ispd18_test3, ispd18_test4, ispd18_test5 and ispd19_test5.

REFERENCE NUMERALS

The following reference numerals are used in the drawings:

101 an initial population of multiple starting points for optimization 102 optimization cost landscape, showing local optima and a global optimum 103 global optimum solution 104 local optima achieved from the population of starting points in a given generation 201 DRC results after DR runs on GR seed 11

202: DRC results after DR runs on GR seed 13

203 DRC results after DR runs on GR seed 1

300 illustration of a long-net's "crossing"

301 guide of long-net in base 302 higher-density hotspot A 303 lower-density hotspot B 304 next-ranking density hotspot C 305 an example of a long-net 306 DRC in the example 307 higher-density hotspot A in the example 308 lower-density hotspot B in the example 309 long-net in the example 401 illustration of hybridization methodology 402 genetic metaheuristic flow for superior GR solutions 403 N parent GR solutions 404 a plurality of bases GR solutions 405 a plurality of hotspots 406 N hybrid child GR solutions 407 Approach 1

408 Approach 2

501 analyze DRC with a plurality of DRs 502 iteration judgment block according to a creation 503 select a plurality of bases (Algorithm 1)

504 hotspot threshold coefficient 505 find a plurality of hotspots (Algorithm 3)

506 find a plurality of patches (Algorithm 2)

507 hybridization patches into bases with the criterion 508 superior GR solutions 601 Method I 602 initial generation of Method I 603 first generation of Method I 604 final generation of Method I 605 Method II 606 initial generation of Method II 607 first generation of Method II 608 final generation of Method II 609 Method III 610 initial generation of Method III 611 first generation of Method III 612 final generation of Method III 613 Method IV 614 initial generation of Method IV 615 first generation of Method IV 616 final generation of Method IV 701 ispd18_test3

702 initial generation of ispd18_test3

703 first generation of ispd18_test3

704 final generation of ispd18_test3

705 ispd18_test5

706 initial generation of ispd18_test5

707 first generation of ispd18_test5

708 final generation of ispd18_test5

709 ispd19 test5

710 initial generation of ispd19 test5

711 first generation of ispd19 test5

712 final generation of ispd19 test5

801 the #DRC and wirelength distributions for all generations of ispd18_test3

802 only the initial, middle and last generations for clearer visualization of ispd18_test3

803 wirelength variation of final generation of ispd18_test3

804 wirelength variation of initial generation of ispd18_test3

805 the #DRC and wirelength distributions for all generations of ispd18_test4

806 only the initial, middle and last generations for clearer visualization of ispd18_test4

807 wirelength variation of final generation of ispd18_test4

808 wirelength variation of initial generation of ispd18_test4

809 the #DRC and wirelength distributions for all generations of ispd18_test5

810 only the initial, middle and last generations for clearer visualization of ispd18_test5

811 wirelength variation of final generation of ispd18_test5

812 wirelength variation of initial generation of ispd18_test5

813 the #DRC and wirelength distributions for all generations of ispd19 test5

814 only the initial, middle and last generations for clearer visualization of ispd19 test5

815 wirelength variation of final generation of ispd19 test5

816 wirelength variation of initial generation of ispd19 test5

901 ispd18_test3

902 initial generation of ispd18_test3

903 first generation of ispd18_test3

904 final generation of ispd18_test3

905 DR based on the two best GR solutions from Gen 0, with iso-DR-computing resource of one Hybridization generation of ispd18_test3

906 ispd18_test4

907 initial generation of ispd18_test4

908 first generation of ispd18_test4

909 final generation of ispd18_test4

910 DR based on the two best GR solutions from Gen 0, with iso-DR-computing resource of one Hybridization generation of ispd18_test4

911 ispd18_test5

912 initial generation of ispd18_test5

913 first generation of ispd18_test5

914 final generation of ispd18_test5

915 DR based on the two best GR solutions from Gen 0, with iso-DR-computing resource of one Hybridization generation of ispd18_test5

916 ispd19 test5

917 initial generation of ispd19 test5

918 first generation of ispd19 test5

919 final generation of ispd19 test5

920 DR based on the two best GR solutions from Gen 0, with iso-DR-computing resource of one Hybridization generation of ispd19 test5

DETAILED DESCRIPTION OF THE PREFERRED EMBODIMENTS

Preferred embodiment methods for automatically creating a global routing solution for an integrated circuit incorporate recognition of the existence of an explicit process of handing off a global routing solution—e.g., as a route guide file—to the ensuing detailed routing step to provide a direct and powerful parameter set that can be used to affect detailed routing success. The present invention directly exploits this parameter set within a genetic metaheuristic framework.

The present invention provides a method and system to automatically create superior global routing (GR) solutions for integrated-circuit layout. Preferred methods systematically patch problematic areas of GR solutions using pieces of other GR solutions, to achieve a genetic or adaptive multi-start metaheuristic paradigm. The patching is performed over the course of one or more generations of such GR solutions. The resulting hybrid global routing solutions lead to superior outcomes in the following detailed routing stage of integrated-circuit layout. Specifically, detailed routing design rule check (DRC) violation counts are substantially lower than what can be achieved even with many thousands of runs of the standard global-detailed routing flow. Preferred methods have demonstrated superior performance when implemented in available open-source academic tools that support communication between global and detailed routing stages. Experimental studies using a standard evaluation setup (the ISPD18/19 Contest testcases) confirm the benefits of preferred methods. Prior methods discussed in the background fail to include such a hybrid approach as in the preferred methods, meaning that the present hybrid approach includes consideration of multiple/ different GR solutions.

Preferred embodiments provide many advantages. Exemplary advantages are (1) The present methods explicitly construct superior global routing solutions using a genetic metaheuristic paradigm. (2) The present methods perform a highly targeted patching to transfer solution fragments, such as individual signal nets' route guides, into one or more GR solutions from a plurality of other GR solutions so as to create one or more new and likely superior individual GR solutions. (3) The present methods are well-suited to the future common-case of IC design automation where (i) multiple solutions may be generated in parallel as preferred in present methods using cloud and multi-core server resources, and (ii) the difficulty of the IC routing problem makes it attractive to trade more "wall time" for optimization in return for superior, easier-to-finalize routing solutions (as our invention offers).

Preferred embodiments address the critical need for global routing automation solutions that lead to detailed routing outcomes with reduced numbers of DRCs. Further, our invention answers in the affirmative the question: Can "good" global routing solutions be systematically generated from "not-good" solutions?— where "good" means that the following detailed routing job ends with an acceptably low number of design rule check violations (DRCs).

Methods and systems of the present invention, or any of its components, can be embodied in the form of a computer system, such as a design optimizer. Typical examples of a computer system include a general-purpose computer, a programmed microprocessor, a micro-controller, a peripheral integrated circuit element, and other devices or arrangements of devices that are capable of implementing the steps that constitute the method of the present invention. The computer system can comprise a computer, an input device, a display unit, and the Internet. The computer comprises a microprocessor, which is connected to a communication bus. The computer also includes a memory, which can include Random Access Memory (RAM) and Read Only Memory (ROM). The computer system further comprises a storage device which can be a hard disk drive or a removable storage drive such as a floppy disk drive, optical disk drive, and so forth. The storage device can also be other similar means of loading computer programs or other instructions into the computer system. The computer system executes a set of instructions that are stored in one or more storage elements, in order to process input data. The storage elements can also hold data or other information, as desired. The storage element can be in the form of an information source or a physical memory element present in the processing machine. Exemplary storage elements include hard disk, DRAM, SRAM and EPROM. The storage element can also be external to the computer system, and connected to or inserted into the computer, for download at or prior to the time of use. Examples of such external computer program products are computer-readable storage media such as CD-ROMS, flash chips, floppy disks, and so forth. The set of instructions can include various commands that instruct the processing machine to perform specific tasks, such as the steps that constitute the method of the present invention. The set of instructions can be in the form of a software program. The software can be in various forms, such as system software or application software. Further, the software might be in the form of a collection of separate programs, a program module with a larger program, or a portion of a program module. The software might also include modular programming in the form of object-oriented programming. The software program containing the set of instructions can be embedded in a computer program product, for use with a computer. The computer program product comprises a computer-usable medium having a computer-readable program code embodied therein. The processing of input data by the processing machine can be in response to user commands or in response to results of previous processing, or in response to a request made by another processing machine. Preferred methods improve performance of 2D IC design and to FPGA (field-programmable gate array) place-and-route.

To apply preferred methods to commercial tools, GR should print out files as a new communication standard such as 'guide' so that users can access them. For example, commercial tool (Cadence Innovus tool) has two GR engines, (1) eGR (early Global Routing) and (2) nanoRoute GR. eGR can make '.guide' (this is not the same format with academic.guide format), but commercial DR (nanoRoute DR) doesn't regards that .guide file. nanoRoute DR only uses nanoRoute GR solution, but there is no generated guide files from nanoRoute GR. Preferred methods provide a new communication to a DR, which can be output in a given form required by the DR. A method can use the private (and internal) data formats/API required by a given commercial DR tool. Present commercial DR does not receive does not receive GR solutions such as guide files as input. Therefore, a commercial DR is also modified with functionality to receive an duse the additional functionality provided by the present methods.

Preferred embodiments of the invention will now be discussed with respect to experiments and drawings. Broader aspects of the invention will be understood by artisans in view of the general knowledge in the art and the description of the experiments that follows.

We first describe our study of the impact of global routing (GR) net ordering on subsequent detailed routing (DR) outcomes. We then describe aspects of an exemplary embodiment of our invention.

A preferred method performs GR with a plurality of random seeds that induce variant net orderings; the method combines the resulting variant GR solutions to obtain a hybrid GR solution which is comprised of per-net GR solutions drawn from the overall GR solution population.

The quality of the GR solution can be assessed based on whether the subsequent detailed routing (DR) is practically feasible. To evaluate the GR solution quality, the post-routing number of design rule violations (#DRC) can be considered as a quantitative indicator. However, like GR, net ordering also affects post-routing quality in solving DR problems.

FIG. 2 shows the distribution of final #DRC values when 50 and 5 random seeds are given to determine the net ordering to be used within each of the GR and DR problems, respectively, for an ISPD-2018 Contest benchmark testcase (S. Mantik, G. Posser, W. Chow, Y. Ding and W.-H. Liu, "ISPD 2018 Initial Detailed Routing Contest and Benchmarks", *Proc. ISPD,* 2018, pp. 140-143). As shown in FIG. 2, when a given global router and a given detailed router are executed on a given placement, the final solution can be highly diverse. For example, GR seed 11 (201) shows a large diversity of #DRC based on the DR seed; GR seed 13 (202) has a large #DRC on average; and GR seed 1 (203) leads to a small diversity and a small #DRC in its outcomes. A "good" GR solution should be robust—achieving small amount of diversity in terms of #DRC achieved in subsequent DR, and minimizing the average value of the final #DRC count.

Our preferred automation framework creates generations of "hybrid" GR solutions, along lines of the adaptive multistart approach. To accomplish this, preferred methods provide a hybridization method for systematically patching a given GR solution to seek a smaller number of DRCs. FIG. 5 shows the overall flow of a preferred method. Step 403 generates an original population of GR solutions by giving a plurality of random GR seeds. Step 501 analyze DRC with a plurality of DRs by giving a plurality of random DR seeds. In step 502, check that the number of DRCs analyzed satisfies the termination criteria. If the termination criteria is not satisfied, proceed hybridization (401), if satisfied, exit the loop and analyzed GR solutions will be the final GR solutions.

To implement hybridization, apply (i) a selection step for bases and patches of a given GR solution population (503, 506), and (ii) a hotspot searching step (504, 505). In addiframework that obtains generations of superior "child" GR solutions while avoiding valleys of local optima in the overall optimization trajectory is also described (406, 501, 502, 508).

Table 1 summarizes the terminologies and notations used in our following descriptions.

TABLE 1

| Terminology and notation table | |
| --- | --- |
| Name | Description |
| DRCs | Design rule violations. |
| $DRCS_{reports}$ | DRC reports obtained after DR runs. |
| $DRCS_{merged}$ | Merged DRC reports derived from a given GR solution (route guide). |
| $GR_{solution}$ | Global routing solution. |
| gene | Global routing guide per net. |
| hybrid | Constructed by one or more insertions of a patch at a hotspot of a base solution. (Also: hybridized.) |
| population | A set of GR solutions. (Also: $GR_{solutions}$.) |
| generation | A population (set of GR solutions), either an original set of GR solutions (Gen 0) or a set of hybridized solutions that exists at the end of a phase of hybridization. |
| fitness | A measure of fitness. (E.g., in an exemplary embodiment, $1/DRCs_{merged}$.) |
| base | A GR solution (e.g., with a small or minimum #DRCs) in the current population, that will be patched at one or more hotspots to produce a hybridized GR solution. |
| patch | Potential patch for hotspot in base GR solution. |
| patches | A set of potential patches for hotspot in base GR solution. |
| hotspot | Hotspot area in $GR_{solution}$ for patching |
| $hotspot_{th}$ | A coefficient that determines the minimum size of the routing hotspot, in an exemplary embodiment. |
| density | Routing hotspot density (e.g., hotspot #DRCs/hotspot area). |
| bbox | Bounding box (i.e., minimum axis-parallel, or isothetic, enclosing rectangle). |

Selection of global routing solutions (bases and patches) for hybridization.

Algorithm 1. Find a plurality of bases global routing
solutions as the $bases_{list}$ for hybridization.

Procedure: FindBaseGuides
Input: Global routing solutions $GR_{solutions}$ and their corresponding detailed routing
DRC reports $DRCs_{reports}$
Output: A plurality of routing guides $bases_{list}$
```
1:          for all GR_solutions[i] ∈ GR_solutions do
2:            for all DRC_reports[j] ∈ DRC_reports do
3:              DRCs_merged[i] += DRCs_reports[j]
4:            end for
5:          end for
6:          for all DRCs_merged[i] ∈ DRCs_merged do
7:            DRCs_cnt[i]= |DRCs_merged[i]|
8:            append [i, DRCs_cnt[i], DRCs_merged[i]] to base_candidates
9:          end for
10:         sort base_candidates according to DRCs_cnt
11:         bases_list = base_candidates
12:         return bases_list
``` tion, apply and compare (iii) a selection of potential methods (Methods I-IV discussed below) to combine GR solutions ("genes") for individual long-nets that traverse multiple hotspots in the layout (506, 507). Such methods are intrinsic to the incorporation of a patch into a base GR solution. The overall flow of hybridization within a genetic metaheuristic In the above exemplary embodiment, we provide preferred steps to select the base GR solution. Given a set of global routing solutions $GR_{solutions}$ and their corresponding detailed routing DRC reports $DRCs_{reports}$, choose as the base the GR solution with the smallest number of DRCs (best fitness) among the GR solution population. As shown in Algorithm 1, Lines 1-5 obtain $DRCS_{merged}$ by adding the number of DRCs and locations of DRCs in $DRCs_{reports}$ for all given $GR_{solutions}$ population. Lines 6-10 count the number of DRCs as 1/fitness score for all $DRCS_{merged}$ and sort the candidates in ascending order. Lines 11-12 return a plurality of sorted GR solutions as $bases_{list}$. Below, initial experimental validations of our invention are performed with the size of $bases_{list}$=2.

As an exemplary embodiment, a procedure for selecting patches to repair given hotspots in a base is provided. As shown in Algorithm 2, Lines 1-14 count the number of DRCs that intersect the bbox of the hotspot among the $DRCS_{merged}$ for all given $GR_{solutions}$ except base, and store numDRC with the corresponding $GR_{solution}$ index in the patches vector. Lines 15-16 sort the patches vector in ascending order of numDRC and return.

---

Algorithm 2 Find GR solutions that can provide elements of a set patches for a given hotspot in a base.

---

Procedure: FindPatchesForHotspot
Input: Population of global routing solutions $GR_{solutions}$ ; their corresponding detailed routing DRC reports $DRCs_{reports}$; bounding box of the given hotspot hotspot.bbox
Output: A set of global routing solutions, patches, to patch the hotspot
1:   for all $GR_{solutions}[i] \in GR_{solutions}$ do
2:    if $GR_{solutions}[i]$ = base then
3:     continue
4:    end if
5:    numDRC = 0
6:    for all $DRCs_{reports}[j] \in DRCs_{reports}$ do
7:     for all $DRC \in DRCs_{reports}[j]$ do
8:      if intersect(DRC, hotspot.bbox) then
9:       numDRC += 1
10:      end if
11:     end for
12:    end for
13:    append [i, numDRC] to patches
14:   end for
15:   sort patches according to numDRC
16:   return patches

---

Searching for Hotspots.

Since a preferred method searches for hotspots after merging $DRC_{reports}$ derived from the $GR_{solution}$, a number of empty windows are generated outside of the hotspots. In addition, if the window size is not changed flexibly according to the number of DRCs, the number of genes that are assigned to the hotspot gradually becomes large relative to the number of DRCs in the hotspot. To efficiently use available computational resources, the optimal extremal-density window approach of Kahng et al. (A. B. Kahng, G. Robins, A. Singh and A. Zelikovsk, "Filling Algorithms and Analyses for Layout Density Control" *IEEE Trans. on CAD* 18(4) (1999), pp. 445-462) can be applied. As used in this paragraph, "windows" means "partial areas" used to focus on the specific areas that user want to find in the entire area. The word "empty window" here means a window that does not include any DRC with the traditional windows. A traditional windows is a grid of tiles of a particular size and a few tiles as windows. After creating an entire area into a grid of tiles of a particular size, a few tiles as windows can be called traditional windows. We used an extremal-density window approach because the traditional approach of windows is inefficient in computational resource usage.

The optimal extremal-density window sets the bbox of the two vertices at the search target as a window, in order to find the maximum density. Since our definition of density is

14

$$\frac{\text{hotspot } \#DRCs}{\text{hotspot size}},$$

the numerator and denominator dimensions are different (i.e., the numerator is a scalar, and the denominator has dimensions of area). Thus, a preferred method adjusts the size of the hotspot by setting a parameter $hotspot_{th}$. As an exemplary embodiment, the value of $hotspot_{th}$ is set according to the overall level of #DRC in the design, based on our preliminary studies. For example, in an exemplary embodiment, a larger value ($hotspot_{th}$=8) is better when there are many initial DRCs (ISPD18_test4 and ISPD19 test5), while a smaller value ($hotspot_{th}$=4) is better when there are fewer initial DRCs (ISPD18_test3 and ISPD18_test5).

As an exemplary embodiment, a method to find routing hotspots is provided. As shown in Algorithm 3, Line 1 enumerates all combinations of DRC location pairs in $DRCs_{merged}$. Lines 2-6 draw the bbox for the two DRC locations of a given DRC pair. Lines 8-12 count all other DRCs intersecting with bbox. Lines 13-14 consider the bbox as a hotspot and calculate density if the number of intersecting DRCs is greater than $|DRCs_{merged}|/hotspot_{th}$. Lines 15-20 append the hotspot, along with the corresponding nets for all guides passing through the hotspot, to the $hotspots_{list}$. Finally, Lines 23-29 sort $hotspots_{list}$ in order of decreasing density, removes any hotspot that overlaps with its predecessor in the sorted $hotspots_{list}$, then returns.

---

Algorithm 3 Find routing hotspots of a base global routing solution

---

Procedure: FindHotspots
Input: Hotspot coefficient $hotspot_{th}$, global routing solution base and corresponding
merged detailed routing DRC reports $DRCs_{merged}$
Output: Hotspot list $hotspots_{list}$ including bounding box and corresponding netlist
1: $pair_{list}$ = combinations($DRCs_{merged}$, 2)
2: for all $pair_i \in pair_{list}$ do
3:  bbox.minX = min($pair_i$.first.minX, $pair_i$.second.minX)
4:  bbox.minY = min($pair_i$.first.minY, $pair_i$.second.minY)
5:  bbox.maxX = min($pair_i$.first.maxX, $pair_i$.second.maxX)
6:  bbox.maxY = min($pair_i$.first.maxY, $pair_i$.second.maxY)
7:  $numDRC_i$ = 0
8:  for all $DRC \in DRCs_{merged}$ do
9:   if intersect( bbox, DRC ) then
10:    $numDRC_i$ += 1
11:   end if
12:  end for
13:  if $numDRC_i$ > $|DRCs_{merged}|$ / $hotspot_{th}$ then
14:   density = $numDRC_i$ / bbox.area
15:   for all net.guide $\in$ base do
16:    if intersect(bbox, net.guide) then
17:     netlist_hotspot.append(net)
18:    end if
19:   end for
20:   append [density, bbox, netlist_hotspot] to $hotspots_{list}$
21:  end if
22: end for
23: sort $hotspots_{list}$ in decreasing order of density
24: for all hotspot[i] $\in hotspots_{list}$ do
25:  if intersect(hotspot.bbox[i], hotspot.bbox[i+1]) then
26:   $hotspots_{list}$.delete[i+1]
27:  end if
28: end for
29: return $hotspots_{list}$

---

Combining Patches into Base Routing Solutions: Dealing with Long-Nets.

To hybridize the GR solutions into one GR solution, the base and patches must be combined into a single global routing (set of route guides) solution. Incorporating individual net guides from a patch into a base solution is straightforward, except for the long-net case, where the long-net extends into multiple hotspots. FIG. 3 shows an illustration of a long-net's (301, 309) "crossing" in two hotspots (302, 307) and (303, 308), which is a case that must be considered when combining base and patches. The example shown on the right (305) is from benchmark ispd18_test4 (from the ISPD-2018 initial detailed routing contest: S. Mantik, G. Posser, W. Chow, Y. Ding and W.-H. Liu, "ISPD 2018 Initial Detailed Routing Contest and Benchmarks", *Proc. ISPD*, 2018, pp. 140-143).

As an exemplary embodiment, when a long-net has pins in two (or more) different hotspots A (302, 307) and B (303, 308), and the hotspots A and B require different patches, there must be an assignment method of the long-net into the hybrid $GR_{solution}$. Four possible methods to assign such a "crossed" long-net are given, as follows.

a. Method I: Assign the long-net to the base, except for any long-net that has pins in both hotspot patches.
 b. Method II: Assign the long-net to the higher-density hotspot A (302, 307).
 c. Method III: Assign the long-net to the lower-density hotspot B (303, 308).
 d. Method IV: Assign the long-net to the higher-density hotspot A (302, 307) and then delete the lower-density hotspot B (303, 308). If more hotspots exist in hotspot-$s_{list}$, push the next-ranking hotspot C (304) as a replacement for the lower-density hotspot.

FIGS. 6A-6D show an exemplary embodiment of some experimental results and provides details of our investigation of these four long-net assignment methods.

Hybridization Flow for One Generation.

Given a GR problem instance—that is to say, a legal standard-cell placement—a preferred method performs GR with different random seeds. For each GR solution, perform DR with different random seeds and obtain the per-region DRC count. Divide the overall layout into hotspot regions and non-hotspot regions. For non-hotspot areas, choose the base with the GR solutions that have the least number of DRCs from among the existing GR solution population. For each given hotspot area, select and patch from the GR solutions that show better results (fewer #DRCs in the hotspot) than the base, for that hotspot area. For each net guide that passes through the hotspot area in the base, the patching operation replaces the base net guide with a patching GR solution.

Algorithm 4 describes an exemplary embodiment of hybridization for a generation. Algorithm 4 takes as inputs (i) the hotspot coefficient and user-defined numbers that determines the minimum size and numbers of the routing hotspot, and (ii) given global routing solutions $GR_{solutions}$ (from different random GR seeds) along with their corresponding detailed routing DRC reports $DRCs_{reports}$. Algorithm 4 then generates hybrid GR solutions. In this exemplary description, for illustrative purposes, use N random GR seeds and apply a plurality of DR seeds for each GR solution to make a total of N×{the number of post-routing DRC reports} as shown in FIG. 4A. Line 1 initializes the a plurality of bases of GR solutions; these are chosen to have the least total sums of #DRC in their corresponding sets of DRC reports (see also Algorithm 1). Lines 2-6 search hotspots satisfying the hotspot$_{th}$ for each base and keep the user-defined number of hotspots H with the highest density. For one exemplary enablement, the number of hotspots is experimentally set as two and the number of patches is experimentally set as five to achieve best results by reducing the total number of generations in the genetic paradigm.

Lines 7-11 find the user-defined number of patches P with the least number of DRCs for each hotspot. Apply these patches for the hotspots to keep the population size of each generation stable. Line 13 generates a total of N hybrid GR solutions (#bases×#patches$^{\#hotspots}$). The term phase is adopted to refer to this production of a new generation of hybridized GR solutions.

| Algorithm 4 Hybridization flow for a generation. |
| --- |
| Input: Hotspot coefficient hotspot$_{th}$, the user-defined number of hotspots H, the user-defined number of patches P, N global routing solutions $GR_{solutions}$ and their corresponding a plurality of detailed routing DRC reports $DRCs_{reports}$ <br> Output: N hybridized global routing solution <br> 1:    bases$_{list}$ = FindBestGuide($GR_{solutions}$, $DRCs_{reports}$) <br> 2:    for all base ∈ bases$_{list}$ do <br> 3:        hotspot$_{list}$ = FindHotspots(hotspot$_{th}$, base → $DRCs_{merged}$) <br> 4:        if \|hotspot$_{list}$\| > H then <br> 5:          keep top H number of hotspots <br> 6:        end if <br> 7:        for all hotspot ∈ hotspot$_{list}$ do <br> 8:          patches = FindPatches($GR_{solutions}$, $DRCs_{reports}$, hotspot) <br> 9:          if \|patches\| > P then <br> 10:           keep top P patches <br> 11:          end if <br> 12:          for all patch ∈ patches do <br> 13:           CombineGuides(patch, base) <br> 14:          end for <br> 15:        end for <br> 16:    end for |

Genetic Metaheuristic Procedure for Hybridization.

A hybrid GR solution that is constructed from given GR solutions should expect to see an improved number of DRCs for hotspots. However, such improvement will usually only exist for the number of DRCs in the hotspot areas. Moreover, seeking improvement while retaining DR convergence is challenging.

FIGS. 4A and 4B show an exemplary embodiment of our present genetic metaheuristic procedure. FIG. 4A (401) shows the hybridization for one generation (with a plurality of base solutions (404), a plurality of hotspots (405) that are patched (406), as described above). The figure shows that in this exemplary embodiment, the method obtains N (the population size) hybrid GR solutions from N parent GR solutions. FIG. 4B (402) illustrates how over the course of multiple generations, the hybridization continues to apply patches as it generates new generations of hybrid GR solutions $GR_{solution}$ in successive phases. Note that the figure illustrates two approaches to maintaining genetic diversity. Approach 1 (solid arrows) (407) draws from the previous generation and the original generation Gen 0 when constructing the next generation of hybrid solutions. Approach 2 (dashed arrows) (408) draws from only the previous generation to construct the next generation, but in our background study we have observed that it can quickly plateau and fail to improve further ("evolutionary stasis"). Thus, for purposes of demonstrating an exemplary enablement, use Approach 1 in all experimental results narrated below. The experimental data below confirm that the genetic metaheuristic framework of FIG. 4 achieves DR convergence robustness and maintains a strong hybridization characteristic, leading to completely DRC-clean results even though the method starts from an original population of "not-good" GR solutions. We mention both Approach 1 and Approach 2 to highlight how one of ordinary skill in the art will readily see numerous variant embodiments of the present invention.

Experiments

To confirm and illustrate the benefits of our invention, we performed experiments on openly available academic contest benchmarks. As an exemplary embodiment, we integrated our framework with the open-source FastRoute (Y. Xu, Y. Zhang and C. Chu, "FastRoute 4.0: Global Router with Efficient Via Minimization", *Proc. ASPDAC,* 2009, pp. 576-581) and TritonRoute (A. B. Kahng, L. Wang and B. Xu, "TritonRoute: The Open Source Detailed Router", *IEEE Trans. on CAD*, to appear. Retrieved from https://vlsicad.ucsd.edu/Publications/Journals/j133.pdf, May 2020) as the global router and detailed router respectively. We obtained the latest releases of these codes from OpenROAD (OpenROAD—Foundations and Realizations of Open and Accessible Design, https://theopenroadproject.org) project GitHub.

As an aspect of an exemplary embodiment, we introduced a random seed-based net order shuffling capability to both FastRoute and TritonRoute: this enables a preferred method to obtain variant global and detailed routing solutions. Outcomes of the random seed-based shuffling are confirmed to be deterministic and reproducible (for any given seed values) in these two tools. For detailed routing in the following experiments, we performed five DR runs with different random seeds for each GR solution, as mentioned above.

We performed our experiments using the testcases from the ISPD-2018/2019 initial detailed routing contest benchmark suites (W.-H. Liu, S. Mantik, W. Chow, Y. Ding, A. Farshidi and G. Posser, "ISPD 2019 Initial Detailed Routing Contest and Benchmark with Advanced Routing Rules", *Proc. ISPD,* 2019, pp. 147-151; and S. Mantik, G. Posser, W. Chow, Y. Ding and W.-H. Liu, "ISPD 2018 Initial Detailed Routing Contest and Benchmarks", *Proc. ISPD,* 2018, pp. 140-143). We apply our framework to the testcases with high #DRC-per-#inst in different technology nodes—ispd18_test3, ispd18_test4, ispd18_test5 and ispd19 test5. Table 2 summarizes the design information. The technology node information in Table 2 accompanies the contest benchmarks as released by the organizers.

TABLE 2

| Design information | | | |
|---|---|---|---|
| Design | #inst | #layer | Tech, node |
| ispd18_test3 | ~36K | 9 | 45 nm |
| ispd18_test4 | ~72K | 9 | 32 nm |
| ispd18_test5 | ~72K | 9 | 32 nm |
| ispd19_test5 | ~29K | 5 | 65 nm |

Study of Long-Net Assignment Methods.

As an exemplary embodiment, we investigated the impact on the #DRC distribution of the four long-net assignment methods. As an additional exemplary embodiment, we separately performed iterative GR hybridization with each of the four long-net assignment methods. We performed this experiment using ispd18_test4 considering its high #DRCto-#inst ratio from the initial (Gen 0) GR solution, with the corresponding #DRC distribution results shown in FIGS. 6A-6D, which show that Method I can achieve rapid #DRC reduction at the beginning, but the improvement stalls after the fourth generation (601, 602, 603, 604). Method II's improvement is insignificant (605, 606, 607, 608); this method fails to match even the improvement of Method I. Method III, as compared to Method I and Method II, achieves better minimum #DRC as well as better #DRC distribution after 13 generations (609, 610, 611, 612). Method IV achieves similar minimum #DRC and #DRC distribution as Method III (613, 614, 615, 616). Considering that Method IV is the only one among the four long-net assignment methods which is capable of fixing multiple hotspots simultaneously, we rank the four long-net assignment methods as Method IV>Method III>Method I>Method II based on these initial data. Therefore, we applied Method IV for all of the following experiments.

Implementation of the Hybridization Methodology.

The hybridization methodology of the present invention can be applied to global routing in many ways. A preferred way is a GR process that determines DR hotspots and patches solutions in the GR process. Here, as an example, and based on the study of long-net assignments, Method IV was used for all design blocks in Table 2. For each testcase, as an exemplary embodiment, we stop the iterative optimization if (i) a maximum generation number of 13 is reached, or (ii) there is no improvement in mean #DRC in three consecutive generations. We show the main results from experimentation with the exemplary embodiments in Table 3, Table 4 and FIG. 7.

Table 3 shows the mean #DRC achieved for each generation in the #DRC distribution shown in FIG. 2 (613, 701, 705, 709). For all designs, we achieve up to 91.2% (avg. 74.6%) mean #DRC reduction (616, 704, 708, 712). We also report the minimum #DRC achieved for each generation and compare the minimum #DRC with the best-known result in the entire literature that we are aware of. For ispd18_test3, ispd18_test4 and ispd18_test5, the best known results are from TritonRoute (A. B. Kahng, L. Wang and B. Xu, "TritonRoute: The Open Source Detailed Router", *IEEE Trans. on CAD*, to appear. Retrieved from https://vlsicad.ucsd.edu/Publications/Journals/j133.pdf, May 2020). For ispd19 test5, the best known result is from Dr. CU (H. Li, G. Chen, B. Jiang, J. Chen and E. F. Y. Young, "Dr. CU 2.0: A Scalable Detailed Routing Framework with Correct-by-Construction Design Rule Satisfaction", *Proc. ICCAD,* 2019, pp. 1-7). We consider the GR solutions from the ISPD contests as reasonably good, and thus the known best #DRC can provide a reference #DRC for each testcase.

Table 4 shows that for all designs, we achieve up to 100% (avg. 75.0%) #DRC reduction as compared to the known best #DRC results. Moreover, three out of the four designs can achieve DRC-clean routing solutions based on the GR solution from our preferred Hybridization methodology. To the best of our knowledge, this is the first time that an academic detailed router has achieved DRC-clean routing solutions for the ispd18_test3, ispd18_test4 and ispd19 test5 testcases, albeit with different route guides than those given in the ISPD18/19 contests. The results indicate that our preferred methodology is capable of iteratively improving GR solutions via its genetic metaheuristic framework—even when given an initial population of GR solutions that always lead to DRC hotspots.

TABLE 3

Comparison of mean #DRC achieved for each generation.

| | Mean #DRC | | | | | | | | | | | | | |
| Benchmark | Gen 0 | Gen 1 | Gen 2 | Gen 3 | Gen 4 | Gen 5 | Gen 6 | Gen 7 | Gen 8 | Gen 9 | Gen 10 | Gen 11 | Gen 12 | Gen 13 |
|---|---|---|---|---|---|---|---|---|---|---|---|---|---|---|
| ispd18_test3 | 8.3 | 4.0 | 3.5 | 3.0 | 3.2 | 3.3 | — | — | — | — | — | — | — | — |
| ispd18_test4 | 32.7 | 26.7 | 13.6 | 13.6 | 7.6 | 5.5 | 6.8 | 6.2 | 10.3 | 21.2 | 15.7 | 8.1 | 5.7 | 4.6 |
| ispd18_test5 | 8.4 | 7.0 | 5.9 | 4.7 | 3.5 | 3.3 | — | — | — | — | — | — | — | — |
| ispd19_test5 | 84.7 | 36.9 | 49.8 | 47.2 | 35.3 | 31.8 | 31.7 | 23.2 | 22.1 | 27.7 | 9.1 | 7.5 | — | — |

TABLE 4

Comparison of minimum #DRC achieved for
each generation with known best (KB) result.

| | Minimum #DRC | | | | | | |
| Benchmark | Gen 0 | Gen 1 | Gen 2 | Gen 3 | Gen 4 | Gen 5 | Gen 6 |
|---|---|---|---|---|---|---|---|
| ispd18_test3 | 3 | 2 | 1 | 0 | 1 | 1 | — |
| ispd18_test4 | 5 | 7 | 1 | 1 | 0 | 0 | 0 |
| ispd18_test5 | 4 | 4 | 3 | 2 | 2 | 2 | — |
| ispd19_test5 | 37 | 20 | 31 | 33 | 22 | 19 | 15 |

| | Minimum #DRC | | | | | | | |
| Benchmark | Gen 7 | Gen 8 | Gen 9 | Gen 10 | Gen 11 | Gen 12 | Gen 13 | KB |
|---|---|---|---|---|---|---|---|---|
| ispd18_test3 | — | — | — | — | — | — | — | 142 |
| ispd18_test4 | 1 | 0 | 0 | 0 | 0 | 0 | 0 | 326 |
| ispd18_test5 | — | — | — | — | — | — | — | 2 |
| ispd19_test5 | 11 | 11 | 13 | 3 | 0 | — | — | 513 |

To illustrate the benefit of our invention, we have also investigated the change in #DRC and wirelength distribution as we proceed with generations. FIGS. 8A-8G show the experimental results from the exemplary embodiment that we have described. The upper graphs (801, 805, 809, 813) shows the #DRC and wirelength distributions for each generation, while the lower graphs (802, 806, 810, 814) only shows the #DRC and wirelength distributions for the initial, middle and final generations for better readability. Due to the nature of ripup-and-reroute-based DRC fixing in detailed routing (DR), we expect the post-routing wirelength to vary based on different net orderings. Moreover, with traditional, iterative ripup-and-reroute, the variance in wirelength is likely to increase if DR starts from different net orderings as the #DRC decreases. However, we can observe that with our Hybridization methodology, the variance in wirelength decreases even as #DRC also decreases (803, 804, 807, 808, 811, 812, 815, 816). We attribute this to the fact that at each generation, we proceed with the two best GR solutions and the GR solution population of a given generation is always less diverse compared to that of the parent generation.
Study of Superiority of Hybridization Methodology.

Finally, to illustrate the benefit of our invention, we have assessed the superiority of our preferred framework from an iso-compute effort standpoint. As an exemplary embodiment, we perform DR based on the best two (Gen 0) GR solutions using 250 random seeds for DR net ordering, and study the resulting #DRC distribution. We performed this experiment for each testcase and compare the #DRC distributions with main results of the exemplary embodiments (FIGS. 7A-7D) based on (i) DR with Gen 0 GR solutions (614, 702, 706, 710), (ii) DR with Gen 1 (hybridized) GR solutions (615, 703, 707, 711), (iii) a large number of DR with the two best GR from Gen 0 GR solutions, and (iv) DR with final-generation GR solutions (616, 704, 708, 712). Our study results are shown in FIGS. 9A-9D, which show plots of #DRC distribution as well as Kernel density estimations. The Kernel density visualization uses the program (M. Waskom, O. Botvinnik, D. O'Kane, P. Hobson, J. Ostblom, S. Lukauskas, D. C. Gemperline, T. Augspurger, Y. Halchenko, J. B. Cole, J. Warmenhoven, J. de Ruiter, C. Pye, S. Hoyer, J. Vanderplas, S. Villalba, G. Kunter, E. Quintero, P. Bachant, M. Martin, K. Meyer, A. Miles, Y. Ram, T. Brunner, T. Yarkoni, M. L. Williams, C. Evans, C. Fitzgerald, Brian and A. Qalieh, "Seaborn: Statistical Data Visualization", 2018. DOI: 10.5281/zenodo.3767070). We can observe that with a large number of DR starts from the best two GR solutions in Gen 0 (905, 910, 915, 920), we can obviously achieve a better #DRC distribution compared to all Gen 0 GR solutions (902, 907, 912, 917). However, the #DRC distribution improvement from such a large number of DR starts is not comparable to the #DRC distribution improvement we achieve from one iteration of Hybridization (903, 908, 913, 918). Considering that 250 DR runs per each of the two best GR solutions from Gen 0 (i) requires the same computing effort for DR as one iteration of Hybridization, and (ii) cannot improve the results that are centered around the two initial best GR solutions, we can clearly observe that Hybridization is superior to simple multiplestart DR (904, 909, 914, 919). Moreover, we note that the testcases in our experiment have very few DRC hotspots, suggesting that the benefit from Hybridization may grow with larger designs that contain more DRC hotspots.

A preferred method demonstrated above is a method for automatically creating a global routing solution for an integrated circuit. The method includes generating an original population of GR solutions (as in step 403). In one or more subsequent phases (Step 503, 504, 505, 506, 507, 406) generating succeeding populations of GR solutions. The generation of each succeeding population includes determining a plurality of base GR solutions (Step 503) from the current population of GR solutions, determining a plurality of DRC hotspot areas (Step 505) within the plurality of base GR solutions, determining a plurality of patching GR solutions (Step 506) from which patches may be extracted, and hybridizing patching (Step 507 and 406) of GR solutions into base GR solutions.

The method can be executed via a machine-readable medium for storing a program in a system that defines a global routing solution for an integrated circuit, the program performing the generation of an original population of GR solutions followed by one or more phases of generating succeeding populations of GR solutions. The method can be executed in a system for defining a global routing solution for an integrated circuit.

Preferably, a method includes conducting DR runs after the step of determining a plurality of base GR (Step 503) and determining a number of DRCs that result after the base GR solutions from the current population are determined by the DR runs (Step 501 and 502). The number of DRCs can be determined via estimation from partially completed DR runs. The DRC density criterion can be a function of numbers of DRCs and hotspot areas. The DRC density criterion can include a lower bound on hotspot areas.

The step of determining can include determining a plurality of DRC hotspot areas within the plurality of base GR solutions comprising ranking of potential hotspots by a DRC density criterion, as in Algorithm 3, Lines 23-29.

Preferably, the step of determining can include determining a plurality of patching GR solutions from which patches may be extracted comprises determining an objective function value (Algorithm 4 (=step 401), Line 9. The user-defined number of patches P=objective function value). The objective function value can be dependent upon the numbers of DRCs that occur in patch regions after GR solutions from the current population are followed by DR runs.

Preferably, the step of hybridizing patching of GR solutions into base GR solutions includes resolving patching of a long-net that spans more than one hotspot in a base GR solution. The resolving can assign a long-net to a lower-density hotspot in a base GR solution. The resolving can assign a long-net to a higher-density hotspot in a base GR solution. The resolving can replace a hotspot that does not receive a long-net assignment by another candidate hotspot.

The generation of a succeeding population of GR solutions can be targeted to maintain a similar population size as one or more preceding populations as in Algorithm 4, where these patches for the hotspots are to keep the population size of each generation stable. Line 13 generates a total of N hybrid GR solutions (#bases×#patches$^{\#hotspots}$).” The similar population size is preferably not more than 15% of the current population.

Preferably, during each phase the step of determining a plurality of patching GR solutions considers one or more GR solutions from the original population. Lines 11-12 of Algorithm 4 return a plurality of sorted GR solutions as bases$_{list}$. Initial experimental validations were performed with the size of bases$_{list}$=2.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for automatically creating a GR (global routing) solution for an integrated circuit, the method comprising:
   generating an original population of GR solutions;
   in one or more subsequent phases, generating succeeding populations of GR solutions, wherein the generation of each succeeding population includes:
      determining a plurality of base GR solutions from the current population of GR solutions;
      determining a plurality of DRC (Design Rule Check Violation) hotspot areas within the plurality of base GR solutions;
      determining a plurality of patching GR solutions from which patches may be extracted; and
      hybridizing patching of GR solutions into base GR solutions.

2. The method of claim 1, comprising conducting DR (detailed routing) runs after the step of determining a plurality of base GR and determining a number of DRCs that result after the base GR solutions from the current population are determined by the DR runs.

3. The method of claim 2, wherein the number of DRCs are determined from more than one DR run per base GR solution.

4. The method of claim 2, wherein the number of DRCs are determined via estimation from partially completed DR runs.

5. The method of claim 1, wherein the step of determining a plurality of DRC hotspot areas within the plurality of base GR solutions comprising ranking of potential hotspots by a DRC density criterion.

6. The method of claim 5, wherein the DRC density criterion is a function of numbers of DRCs and hotspot areas.

7. The method of claim 5, wherein where the DRC density criterion includes a lower bound on hotspot areas.

8. The method of claim 1, wherein the step of determining a plurality of patching GR solutions from which patches may be extracted comprises determining an objective function value.

9. The method of claim 8, wherein the objective function value is dependent upon the numbers of DRCs that occur in patch regions after GR solutions from the current population are followed by DR runs.

10. The method of claim 1, wherein the step of hybridizing patching of GR solutions into base GR solutions comprises resolving patching of a long-net that spans more than one hotspot in a base GR solution.

11. The method of claim 10, wherein the resolving assigns a long-net to a lower-density hotspot in a base GR solution.

12. The method of claim 10, wherein the resolving assigns a long-net to a higher-density hotspot in a base GR solution.

13. The method of claim 10, wherein the resolving replaces a hotspot that does not receive a long-net assignment by another candidate hotspot.

14. The method of claim 1, wherein the generation of a succeeding population of GR solutions is targeted to maintain a similar population size as one or more preceding populations.

15. The method of claim 14, wherein the similar population size is not more than 15% of the current population.

16. The method of claim 1, wherein during each phase the step of determining a plurality of patching GR solutions considers one or more GR solutions from the original population.

17. An integrated circuit design optimizer running the method of claim 1.

18. A method of manufacturing an integrated circuit comprising optimizing a design according to the method of claim 1 and conducting fabrication of the design.

19. A non-transitory computer readable medium storing a program in a system that defines a global routing solution for an integrated circuit, said program performing the generation of an original population of GR (Global Routing) solutions followed by one or more phases of generating succeeding populations of GR solutions, wherein the generation of each succeeding population comprises the steps of:

determining a plurality of base GR solutions from the current population of GR solutions;

determining a plurality of DRC (Design Rule Check Violation) hotspot areas within the plurality of base GR solutions;

determining a plurality of patching GR solutions from which patches may be extracted; and hybridizing patching of GR solutions into base GR solutions.

20. A system for defining a GR (global routing) solution for an integrated circuit, comprising code directing a computer to:

perform the generation of an original population of GR solutions followed by one or more phases of generating succeeding populations of GR solutions;

determine a plurality of base GR solutions from a current population of GR solutions;

determine a plurality of DRC (Design Rule Check Violation) hotspot areas within a plurality of base GR solutions;

determine a plurality of patching GR solutions from which patches may be extracted; and hybridize patching of GR solutions into base GR solutions.

* * * * *